United States Patent
Hayashi

(10) Patent No.: US 8,040,400 B2
(45) Date of Patent: Oct. 18, 2011

(54) SIGNAL PROCESSING DEVICE, IMAGE SENSING SYSTEM, AND SIGNAL PROCESSING METHOD

(75) Inventor: Hidetoshi Hayashi, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 11/831,194

(22) Filed: Jul. 31, 2007

(65) Prior Publication Data

US 2008/0036884 A1   Feb. 14, 2008

(30) Foreign Application Priority Data

Aug. 8, 2006   (JP) .................................. 2006-216219

(51) Int. Cl.
H04N 5/217   (2006.01)
H04N 3/14   (2006.01)
(52) U.S. Cl. ........................................ 348/241; 348/308
(58) Field of Classification Search .................. 348/241, 348/308
See application file for complete search history.

(56) References Cited

U.S. PATENT DOCUMENTS

| 6,307,195 | B1 * | 10/2001 | Guidash ...................... 250/208.1 |
| 6,546,203 | B2 | 4/2003 | Hofer |
| 6,853,806 | B2 | 2/2005 | Nakata et al. |
| 6,963,367 | B1 * | 11/2005 | Hashimoto .................... 348/241 |
| 6,999,116 | B1 | 2/2006 | Hieda |
| 7,167,200 | B1 * | 1/2007 | Phan et al. .................... 348/308 |
| 7,397,505 | B2 * | 7/2008 | Brehmer et al. ............... 348/243 |
| 2003/0184827 | A1 | 10/2003 | Fleury et al. |
| 2004/0047621 | A1 * | 3/2004 | Shimizu et al. ............... 396/100 |
| 2006/0072025 | A1 * | 4/2006 | Kakumoto et al. ........... 348/308 |
| 2006/0176519 | A1 * | 8/2006 | Ouchi ............................ 358/443 |
| 2007/0035641 | A1 * | 2/2007 | Yamada et al. ............... 348/241 |
| 2007/0080376 | A1 * | 4/2007 | Adachi et al. ................ 257/239 |
| 2009/0295967 | A1 * | 12/2009 | Gomi ............................ 348/308 |

FOREIGN PATENT DOCUMENTS

| JP | 2000-41177 | A | 2/2000 |
| JP | 2000-58806 | A | 2/2000 |
| JP | 2000-69354 | A | 3/2000 |
| JP | 2000-201295 | A | 7/2000 |
| JP | 2000-270266 | A | 9/2000 |
| JP | 2000-333075 | A | 11/2000 |
| JP | 2001-24949 | A | 1/2001 |
| JP | 2002-372733 | A | 12/2002 |
| JP | 2003-101876 | A | 4/2003 |
| JP | 2003-250067 | A | 9/2003 |
| JP | 2003-309764 | A1 | 10/2003 |
| JP | 2005-130486 | A | 5/2005 |
| JP | 2006-302095 | A | 11/2006 |

OTHER PUBLICATIONS

Machine Translation of JP 2000-270266, Nakagawam, Aug. 29, 2000.*

* cited by examiner

*Primary Examiner* — David Ometz
*Assistant Examiner* — Dillon Durnford Geszvain
(74) *Attorney, Agent, or Firm* — Fitzpatrick, Cella, Harper & Scinto

(57) ABSTRACT

An image sensing system is disclosed. The image sensing system includes a signal determination unit which recognizes a saturated region of an image obtained by photoelectric conversion where the signal level is saturated, and a desaturated region where the signal level is not saturated, and determines whether an inner region serving as a desaturated region surrounded by the saturated region exists.

17 Claims, 23 Drawing Sheets

SIGNAL PROCESSING DEVICE, IMAGE SENSING SYSTEM, AND SIGNAL PROCESSING METHOD

BACKGROUND OF THE INVENTION

1. Field of the Invention

The present invention relates to a signal processing device, image sensing system, and signal processing method.

2. Description of the Related Art

There has conventionally been proposed an amplifier type image sensing system, particularly a CMOS (Complementary Metal Oxide Semiconductor) image sensing system, as disclosed in Japanese Patent Laid-Open No. 2001-24949. Compared to a CCD image sensing system, the CMOS image sensing system has various merits: 1) it has low noise, 2) it has small power consumption, 3) it is drivable by a single power supply, and 4) its light-receiving portion and peripheral circuit are manufacturable by the same process.

In the CMOS image sensing system, when extremely bright light enters a pixel in capturing an image of the sun or the like, the luminance component of the pixel signal of the pixel attenuates, and the gray level of the pixel may drop to black (bright light image inversion phenomenon).

To avoid this phenomenon, according to the technique disclosed in Japanese Patent Laid-Open No. 2001-24949, it is determined that bright light image inversion phenomenon has occurred when the signal level reaches the saturation signal level. A process (to be referred to as a removal process hereinafter) to remove a pixel reset signal from an electrical signal output from the photoelectric converter stops unconditionally. This can prevent bright light image inversion phenomenon.

However, even if the signal level reaches the saturation signal level, bright light image inversion phenomenon may or may not occur. In this case, stopping the removal process unconditionally may increase fixed-pattern noise. As a result, noise may be superposed in the finally obtained image, degrading image quality.

SUMMARY OF THE INVENTION

It is an object of the present invention to provide a signal processing method and image sensing system capable of, for example, suppressing image degradation and reducing the influence of bright light image inversion phenomenon.

A signal processing device according to the first aspect of the present invention is comprising a signal determination unit which recognizes a saturated region of an image obtained by photoelectric conversion where a signal level is saturated, and a desaturated region where the signal level is not saturated, and determines whether an inner region serving as a desaturated region surrounded by the saturated region exists.

An image sensing system according to the second aspect of the present invention is comprising an optical system, an image sensor on which an optical image of an object can be formed via the optical system, and the above-described signal processing device which receives an image signal from the image sensor.

A signal processing method according to the third aspect of the present invention is comprising a recognition step of recognizing a saturated region of an image obtained by photoelectric conversion where a signal level is saturated, and a desaturated region where the signal level is not saturated, and a signal determination step of determining whether an inner region serving as a desaturated region surrounded by the saturated region exists.

The present invention can, for example, suppress image degradation and reduce the influence of bright light image inversion phenomenon.

Further features of the present invention will become apparent from the following description of exemplary embodiments with reference to the attached drawings.

DESCRIPTION OF THE EMBODIMENTS

An image sensing system according to the first embodiment of the present invention will be described. The image sensing system is applicable not only to a so-called digital camera, digital video camera, and the like, but also to contact type line sensors such as a scanner and copying machine.

Figure 1:
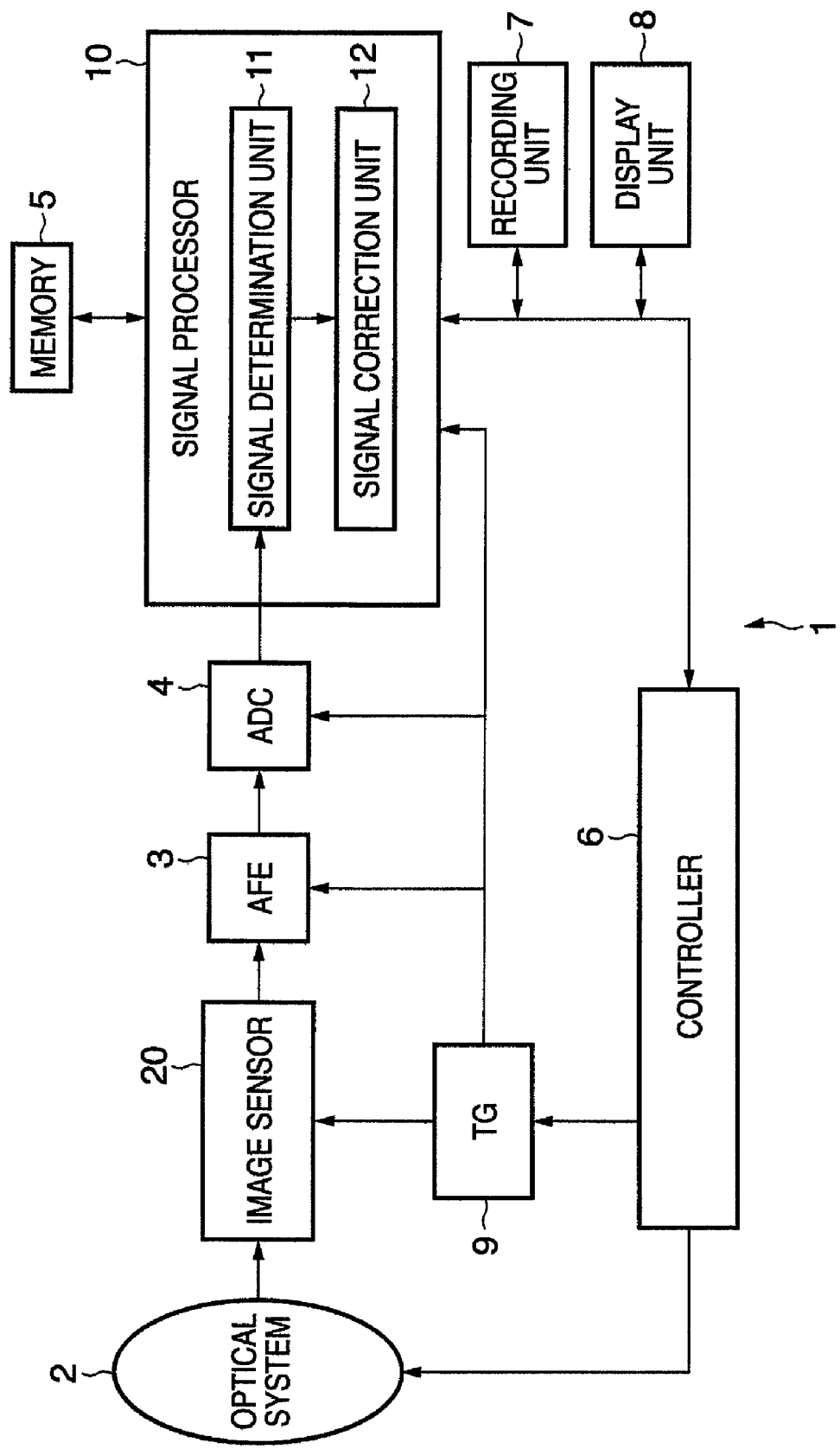
FIG. 1 is a block diagram of the configuration of an image sensing system according to the first embodiment of the present invention.

The schematic configuration and schematic operation of the image sensing system according to the first embodiment of the present invention will be described with reference to FIG. 1. FIG. 1 is a block diagram of the configuration of the image sensing system according to the first embodiment of the present invention.

An image sensing system 1 comprises an optical system 2, image sensor 20, AFE (Analog Front End) 3, ADC (Analog Digital Converter) 4, signal processor (signal processing device) 10, memory 5, recording unit 7, display unit 8, controller 6, and TG (Timing Generator) 9.

The optical system 2 is interposed between an object (not shown) and the image sensor 20, and forms an optical image of the object on the image sensor 20. The optical system 2 includes, for example, lenses, a stop, and a color filter. The lenses also include a SELFOC lens which forms an image in contact. The lenses form an optical image of the object on the image sensor 20. The stop reduces the light quantity supplied to the image sensor 20. The color filter performs color separation. When the image sensor 20 is a monochrome image sensor, the image sensor 20 may not include any color filter.

The image sensor 20 is connected to the AFE 3. The image sensor 20 includes, for example, a CMOS sensor and its peripheral circuit. The image sensor 20 generates an image signal (analog signal) corresponding to a received light quantity, and outputs it to the AFE 3.

The AFE 3 is connected to the image sensor 20 and ADC 4. The AFE 3 applies a gain to an image signal (analog signal) received from the image sensor 20. The AFE 3 performs an analog signal to, for example, clamp a gain-applied signal at dark level. This process adjusts the image signal to match the input range of the succeeding ADC (Analog Digital Converter) 4.

The ADC 4 is connected to the AFE 3 and signal processor 10. The ADC 4 converts an adjusted image signal (analog signal) received from the AFE 3 into an image signal (digital signal). The ADC 4 outputs the image signal (digital signal) to the signal processor 10.

The signal processor 10 is connected to the ADC 4, memory 5, recording unit 7, display unit 8, and controller 6. The signal processor 10 performs a predetermined signal process for an image signal (digital signal) received from the ADC 4 and outputs it to the memory 5, recording unit 7, display unit 8, and controller 6.

The memory 5 is connected to the signal processor 10. The memory 5 receives and temporarily stores a corrected image signal (digital signal).

The recording unit 7 is connected to the signal processor 10 and controller 6. The recording unit 7 records a corrected image signal (digital signal) received from the signal processor 10 on a recording medium in accordance with a control signal supplied from the controller 6. Examples of the recording medium are an SD (Japanese registered trademark) memory, compact flash (Japanese registered trademark), and video tape.

The display unit 8 is connected to the signal processor 10 and controller 6. The display unit 8 displays, on a display device, an image corresponding to a corrected image signal (digital signal) received from the signal processor 10 in accordance with a control signal supplied from the controller 6. An example of the display device is a liquid crystal display functioning as a viewfinder.

The controller 6 is connected to the optical system 2, TG 9, recording unit 7, display unit 8, and signal processor 10, and controls the whole system. For example, when operated with an external operation means (not shown), the controller 6 executes communication and control corresponding to the operation. Upon receiving information representing an excessive light quantity state in which the entire frame becomes saturated, the controller 6 controls to narrow down the stop of the optical system 2. Alternatively, the controller 6 controls the exposure time by supplying a signal to the TG 9 driving the image sensor 20.

Figure 2:
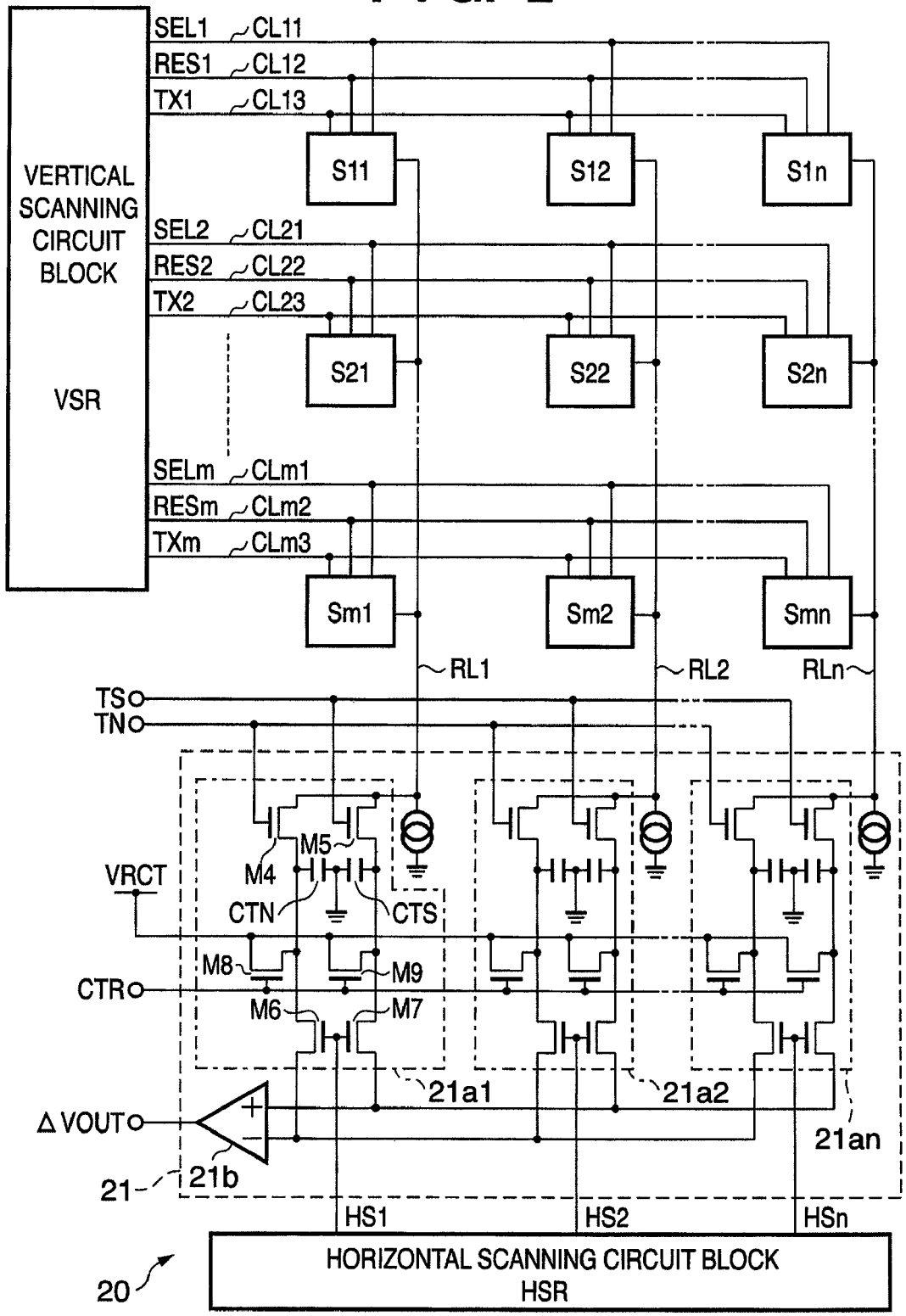
FIG. 2 is a circuit diagram of the arrangement of an image sensor.

The schematic arrangement and schematic operation of the image sensor will be described. FIG. 2 is a circuit diagram of the arrangement of the image sensor.

The image sensor 20 comprises pixel units S11 to Smn, control signal lines CL11 to CLm3, a vertical scanning circuit block VSR, column signal lines RL1 to RLn, a horizontal scanning circuit block HSR, and a CDS (Correlated Double Sampling) circuit 21. The CDS circuit 21 includes holding circuits 21$a$1 to 21$an$, and a differential circuit 21$b$.

As shown in FIG. 2, the pixel units S11 to Smn are arrayed two-dimensionally (in the row and column directions).

The control signal lines CL11 to CLm3 run along the row direction of the array of the pixel units S11 to Smn. The control signal lines CL11 to CLm3 are connected to the vertical scanning circuit block VSR at the periphery of the array of the pixel units S11 to Smn. The select signals SEL1 to SELm, reset signals RES1 to RESm, and transfer signals TX1 to TXm are supplied to the pixel units S11 to Smn via the control signal lines CL11 to CLm3.

The column signal lines RL1 to RLn run along the column direction of the array of the pixel units S11 to Smn. The column signal lines RL1 to RLn are connected to the CDS circuit 21 and horizontal scanning circuit block HSR at the periphery of the array of the pixel units S11 to Smn. The noise electric potential VN or signal electric potential VS is output to the holding circuits 21$a$1 to 21$an$ for each column from the pixel units S11 to Smn via the column signal lines RL1 to RLn, and held by the holding circuits 21$a$1 to 21$an$. The horizontal scanning circuit block HSR sequentially reads out the noise electric potential VN and signal electric potential VS from the holding circuits 21$a$1 to 21$an$, and supplies them to the differential circuit 21$b$. The differential circuit 21$b$ calculates the difference (image signal $\Delta$VOUT) between the noise electric potential VN and the signal electric potential VS for each column. The differential circuit 21$b$ outputs the image signal (analog signal) $\Delta$VOUT to the AFE 3 (see FIG. 1).

The detailed arrangement of the pixel unit will be explained with reference to FIG. 3.

Figure 3:
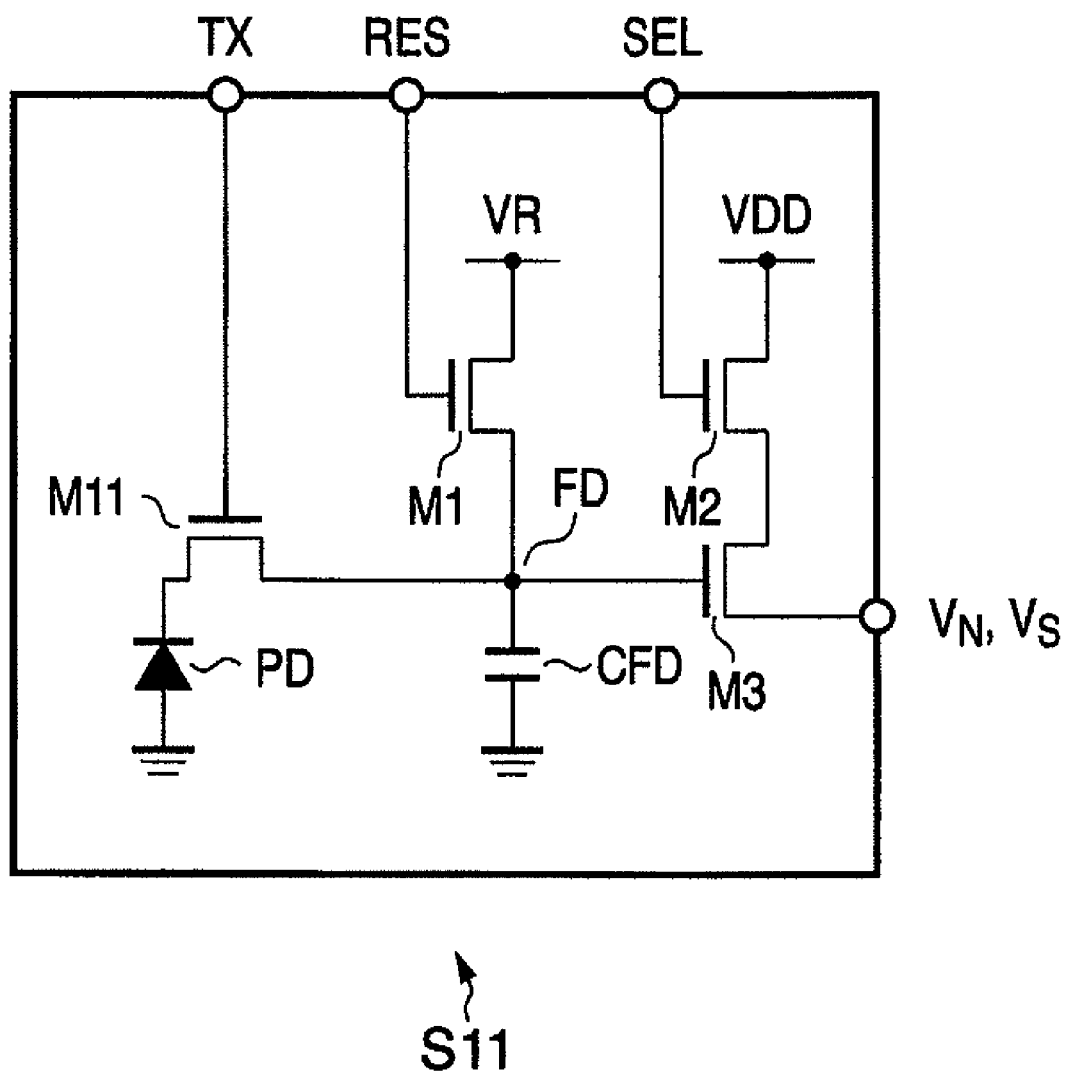
FIG. 3 is a circuit diagram showing the arrangement of a pixel unit in the image sensor.

FIG. 3 is a circuit diagram showing the arrangement of the pixel unit in the image sensor. The pixel unit S11 in FIG. 2 will be mainly described, but the following description also applies to the remaining pixel units.

The pixel unit S11 of the image sensor 20 comprises a photodiode (photoelectric converter) PD, transfer transistor M11, amplifier transistor M3, reset transistor M1, and select transistor M2.

The photodiode PD has an anode connected to ground electric potential GND, and a cathode connected to the transfer transistor M11. The transfer transistor M11 has a source connected to the photodiode PD, and a drain connected to the floating diffusion FD. The transfer transistor M11 has a gate connected to the control signal line CL13 (see FIG. 2), and receives the transfer signal TX1 at its gate. The floating diffusion FD forms the floating diffusion capacitance $C_{FD}$ serving as a parasitic capacitance between the floating diffusion FD and ground electric potential GND. The reset transistor M1 has a source connected to the floating diffusion FD, and a drain connected to the reset electric potential VR. The reset transistor M1 has a gate connected to the control signal line CL12 (see FIG. 2), and receives the reset signal RES1 at its gate. The select transistor M2 has a source connected to the amplifier transistor M3, and a drain connected to the power supply electric potential VDD. The select transistor M2 has a gate connected to the control signal line CL11 (see FIG. 2), and receives the select signal SEL1 at its gate. The amplifier transistor M3 has a source connected to the column signal line RL1, a drain connected to the select transistor M2, and a gate connected to the floating diffusion FD.

The detailed arrangement of the holding circuit of the CDS circuit 21 will be described with reference to FIG. 2. The holding circuit 21a1 will be exemplified, but the following description also applies to the remaining holding circuits 21a2 to 21an.

The holding circuit 21a1 of the CDS circuit 21 includes transistors M4 to M9, a noise electric potential holding capacitance CTN, and a signal electric potential holding capacitance CTS.

The transistor M4 has a drain connected to the column signal line RL1, and a source connected between the noise electric potential holding capacitance CTN and the transistor M8. The transistor M4 receives the noise electric potential transfer signal TN at its gate. The transistor M5 has a drain connected to the column signal line RL1, and a source connected to the signal electric potential holding capacitance CTS and transistor M9. The transistor M5 receives the signal electric potential transfer signal TS at its gate. The transistor M8 has a drain connected to the holding capacitance reset electric potential VRCT, and a source connected to the noise electric potential holding capacitance CTN and transistor M6. The transistor M8 receives the holding capacitance reset signal CTR at its gate. The transistor M9 has a drain connected to the holding capacitance reset electric potential VRCT, and a source connected to the signal electric potential holding capacitance CTS and transistor M7. The transistor M9 receives the holding capacitance reset signal CTR at its gate. The transistor M6 has a drain connected to the noise electric potential holding capacitance CTN and transistor M8, and a source connected to the inverting input terminal of the differential circuit 21b. The transistor M6 receives the horizontal scanning signal HS1 at its gate. The transistor M7 has a drain connected to the signal electric potential holding capacitance CTS and transistor M9, and a source connected to the non-inverting input terminal of the differential circuit 21b. The transistor M7 receives the horizontal scanning signal HS1 at its gate.

Figure 4:
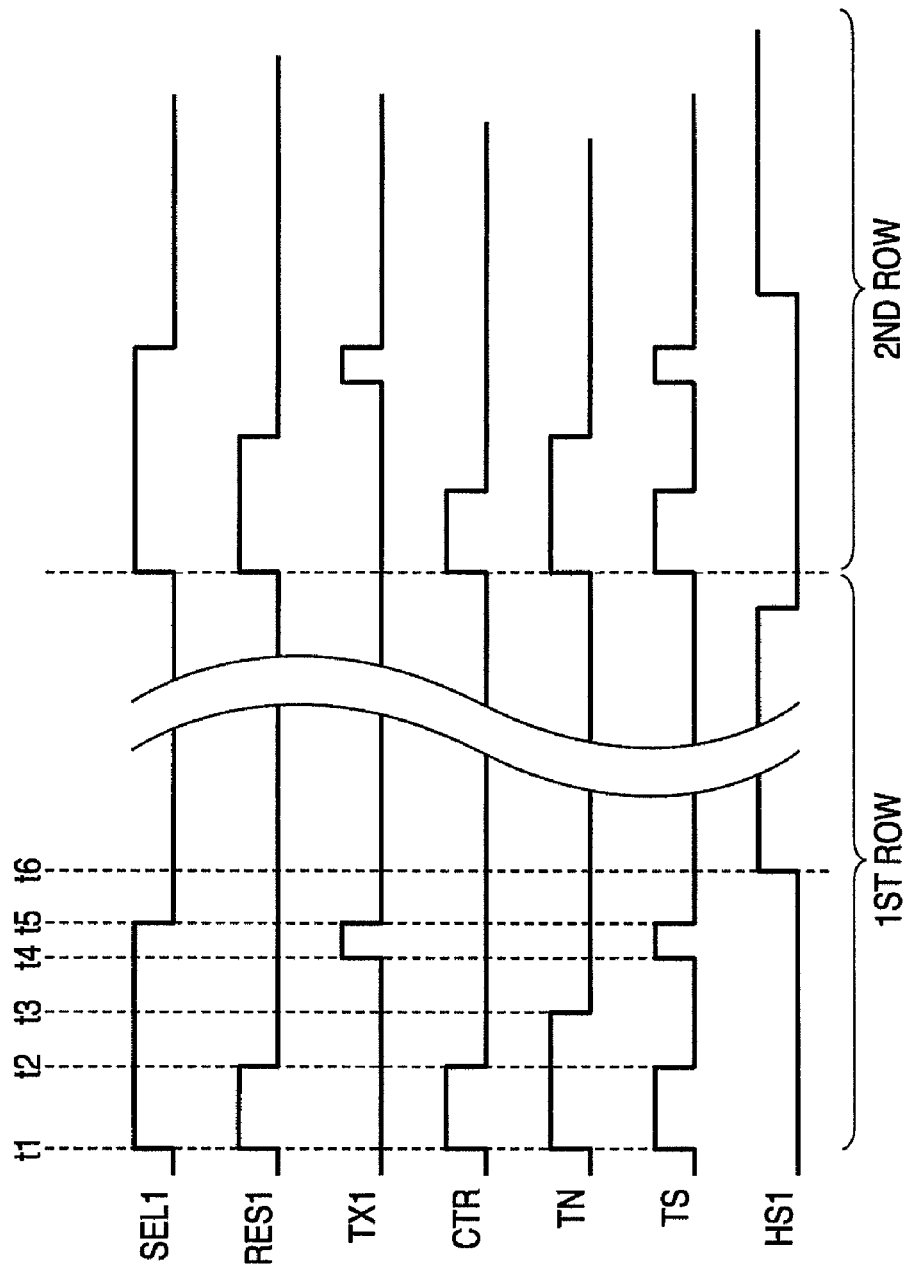
FIG. 4 is a timing chart showing the operation of the image sensor.

The detailed operation of the image sensor will be explained with reference to FIG. 4. FIG. 4 is a timing chart showing the operation of the image sensor.

At timing t1, the vertical scanning circuit block VSR activates the select signal SEL1. Then, the pixel units S11 to S1n on the first row are selected to turn on their select transistors M2.

The vertical scanning circuit block VSR activates the reset signal RES1. Then, the reset transistors M1 of the pixel units S11 to S1n are turned on to reset the floating diffusions FD. The electric potential of the floating diffusion FD changes to almost the reset electric potential VR (≈power supply electric potential VDD).

The vertical scanning circuit block VSR activates the holding capacitance reset signal CTR, noise electric potential transfer signal TN, and signal electric potential transfer signal TS. Then, charges remaining in the noise electric potential holding capacitance CTN and signal electric potential holding capacitance CTS are reset, and the electric potentials of the column signal lines RL1 to RLn change to almost the holding capacitance reset electric potential VRCT (≈power supply electric potential VDD).

At timing t2, the vertical scanning circuit block VSR inactivates the reset signal RES1. Then, the amplifier transistors M3 amplify signals at the electric potentials of the floating diffusions FD, and output the amplified signals to the column signal lines RL1 to RLn.

The vertical scanning circuit block VSR inactivates the holding capacitance reset signal CTR and signal electric potential transfer signal TS while keeping the noise electric potential transfer signal TN active. The transistors M4 of the CDS circuit 21 are turned on to transfer the electric potentials of the column signal lines RL1 to RLn as the noise electric potential VN to the noise electric potential holding capacitances CTN. That is, the noise electric potential VN is read out from the pixel units S11 to S1n to the CDS circuit 21. Meanwhile, the transistors M5 of the CDS circuit 21 are turned off.

At the interval between timings t2 and t3, the transfer transistors M11 of the pixel units S11 to S1n are OFF, and the photodiodes PD are electrically disconnected from the floating diffusions FD. When, however, a large quantity (high brightness) of light enters the photodiode PD, charges may overflow from the photodiode PD to the floating diffusion FD. In this case, the electric potential of the floating diffusion FD attenuates from the reset electric potential VR, and the noise electric potential VN also attenuates.

At timing t3, the vertical scanning circuit block VSR inactivates the noise electric potential transfer signal TN. Then, the transistors M4 of the CDS circuit 21 are turned off to disconnect the column signal lines RL1 to RLn from the noise electric potential holding capacitances CTN. The noise electric potential holding capacitance CTN holds the noise electric potential VN.

At timing t4, the vertical scanning circuit block VSR activates the transfer signal TX1. Then, the transfer transistors M11 of the pixel units S11 to S1n are turned on to transfer charges stored in the photodiodes PD to the floating diffusions FD. The electric potential of the floating diffusion FD drops in accordance with the amount of transferred charges. The amplifier transistors M3 amplify signals at the electric potentials of the floating diffusions FD, and output the amplified signals to the column signal lines RL1 to RLn.

The vertical scanning circuit block VSR activates the signal electric potential transfer signal TS. The transistors M5 of the CDS circuit 21 are turned on to transfer the electric potentials of the column signal lines RL1 to RLn as the signal electric potential VS to the signal electric potential holding capacitances CTS. That is, the signal electric potential VS is read out from the pixel units S11 to S1n to the CDS circuit 21. Meanwhile the transistors M4 of the CDS circuit 21 are OFF.

At timing t5, the vertical scanning circuit block VSR inactivates the transfer signal TX1. Then, the transfer transistors M11 of the pixel units S11 to S1n are turned off to disconnect the photodiodes PD from the floating diffusions FD.

The vertical scanning circuit block VSR inactivates the signal electric potential transfer signal TS. Then, the transistors M5 of the CDS circuit 21 are turned off to disconnect the column signal lines RL1 to RLn from the signal electric potential holding capacitances CTS. The signal electric potential holding capacitance CTS holds the signal electric potential VS.

At timing t6, the horizontal scanning circuit block HSR activates the horizontal scanning signal HS1. Then, the transistor M6 of the CDS circuit 21 is turned on to input the noise electric potential VN held in the noise electric potential holding capacitance CTN to the inverting input terminal of the differential circuit 21b. Similarly, the transistor M7 of the CDS circuit 21 is turned on to input the signal electric potential VS held in the signal electric potential holding capacitance CTS to the non-inverting input terminal of the differential circuit 21b. The differential circuit 21b calculates the difference (image signal ΔVOUT) between the noise electric potential VN and the signal electric potential VS for the first column on the first row, and outputs it to the AFE 3 (see FIG. 1).

After that, the horizontal scanning circuit block HSR also sequentially activates the horizontal scanning signals HS2 to HSn to calculate and output the image signals ΔVOUT for the second to nth columns on the first row.

In this manner, the image signals ΔVOUT for the first row are output. The same sequence is repeated to also output the image signals ΔVOUT for the second and subsequent rows. Finally, two-dimensional image signals ΔVOUT of one frame are output to the AFE 3 (see FIG. 1).

Figure 5:
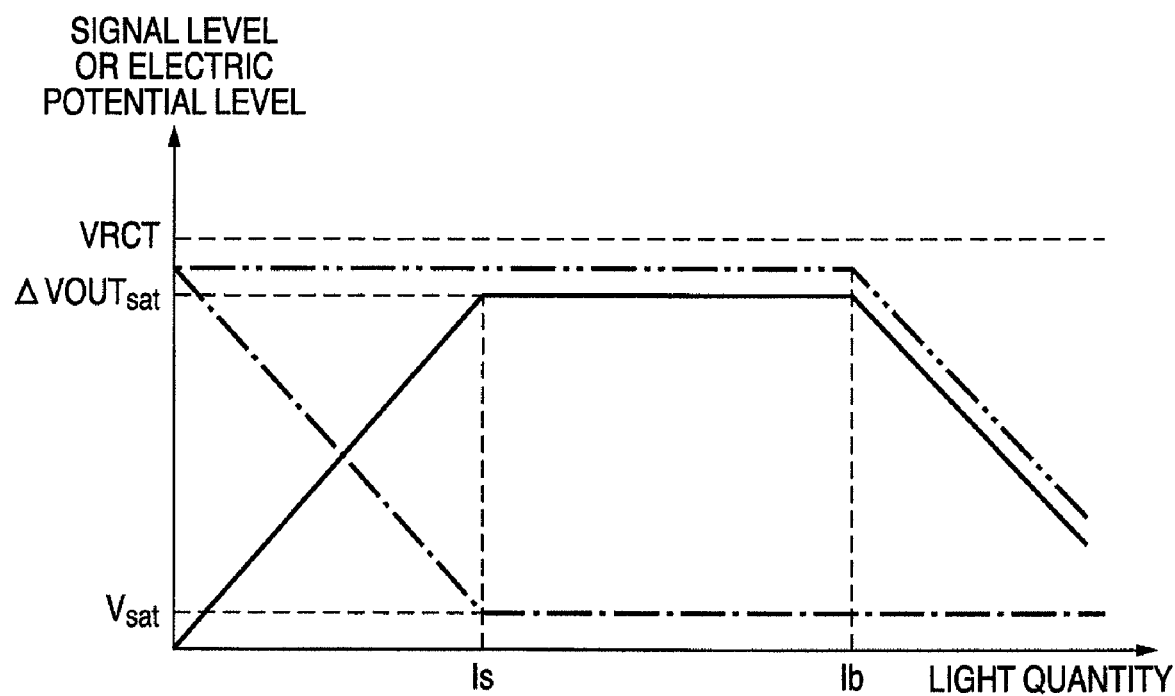
FIG. 5 is a graph showing the relationship between the signal level or electric potential level and the light quantity.

Bright light image inversion phenomenon will be explained with reference to FIG. 5. FIG. 5 is a graph showing the relationship between the signal level or electric potential level and the light quantity. In FIG. 5, the ordinate axis represents the signal level or electric potential level, and the abscissa axis represents the light quantity. In FIG. 5, the solid line indicates the image signal ΔVOUT, the chain line indicates the signal electric potential VS, and the chain double-dashed line indicates the noise electric potential VN.

If the quantity of light incident on the photodiode PD (see FIG. 3) is equal to or smaller than the saturation light quantity Is in the interval between timings t2 and t3 (see FIG. 4), the noise electric potential VN is smaller than the holding capacitance reset electric potential VRCT by a magnitude corresponding to fixed-pattern noise. The signal electric potential VS drop toward the saturation electric potential $V_{sat}$ and does not reach the saturation electric potential $V_{sat}$. In other words, the signal electric potential VS drops as the light quantity increases. The image signal ΔVOUT becomes free from fixed-pattern noise, and reflects the quantity of light incident on the photodiode PD.

If the quantity of light incident on the photodiode PD is equal to or larger than the saturation light quantity Is and equal to or smaller than an image inversion light quantity Ib in the interval between timings t2 and t3, the noise electric potential VN is smaller than the holding capacitance reset electric potential VRCT by a magnitude corresponding to fixed-pattern noise. The image inversion light quantity Ib is a light quantity at which bright light image inversion phenomenon starts to appear. Even if the light quantity increases beyond the saturation light quantity Is, the signal electric potential VS is down to the saturation electric potential $V_{sat}$ and stays constant. Thus, the image signal ΔVOUT becomes free from fixed-pattern noise, is saturated at the saturation signal amount $\Delta VOUT_{sat}$, and approximately reflects the quantity of light incident on the photodiode PD.

If, however, the quantity of light incident on the photodiode PD is equal to or larger than the image inversion light quantity Ib in the interval between timings t2 and t3, the noise electric potential VN attenuates from the holding capacitance reset electric potential VRCT by more than a magnitude corresponding to fixed-pattern noise. In other words, the noise electric potential VN attenuates from the actual noise potential, which is smaller than the holding capacitance reset electric potential VRCT by a magnitude corresponding to fixed-pattern noise. More specifically, the noise electric potential VN greatly attenuates from the holding capacitance reset electric potential VRCT as the light quantity increases. The signal electric potential VS drops toward the saturation electric potential $V_{sat}$. The image signal ΔVOUT attenuates from the saturation signal amount $\Delta VOUT_{sat}$, and the brightness becomes lower than an actual one.

The detailed arrangement of the signal processor will be described with reference to FIG. 1.

The signal processor 10 includes a signal determination unit 11 and signal correction unit 12.

The signal determination unit 11 is connected to the ADC 4, memory 5, and signal correction unit 12. The signal determination unit 11 stores the image signal (digital signal) of each pixel received from the ADC 4 in the memory 5. The signal determination unit 11 acquires a 1-frame image signal (digital signal) from the memory 5. Based on the 1-frame image signal (digital signal), the signal determination unit 11 determines whether the image signal represents a predetermined image pattern. The signal determination unit 11 outputs the 1-frame image signal (digital signal) and the determination result to the signal correction unit 12.

The signal correction unit 12 is connected to the signal determination unit 11, memory 5, recording unit 7, display unit 8, and controller 6. The signal correction unit 12 corrects a 1-frame image signal (digital signal) on the basis of the determination result. The signal correction unit 12 outputs a corrected image signal (digital signal) to the memory 5 and controller 6.

Figure 6:
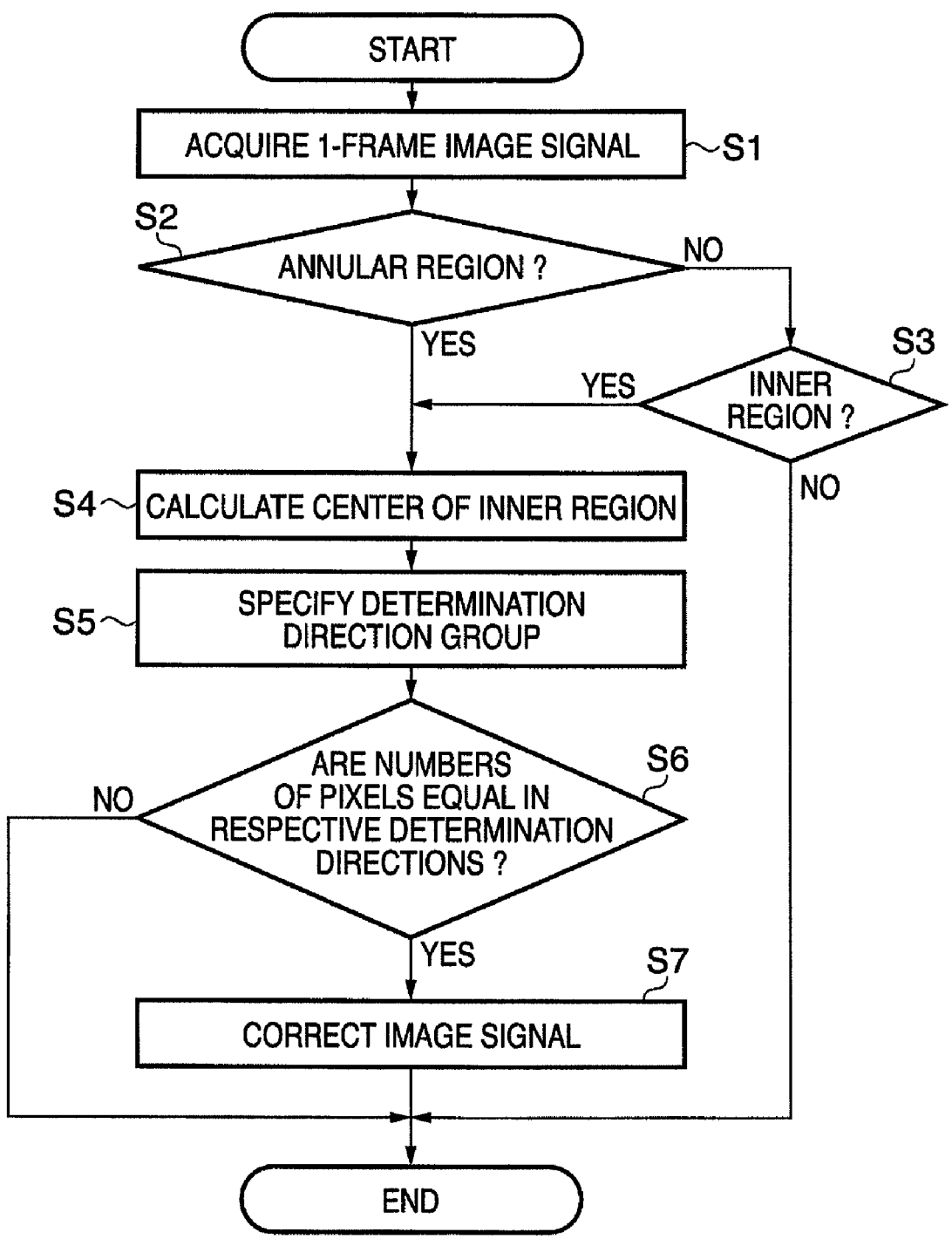
FIG. 6 is a flowchart showing the operation of a signal processor.
Figure 7:
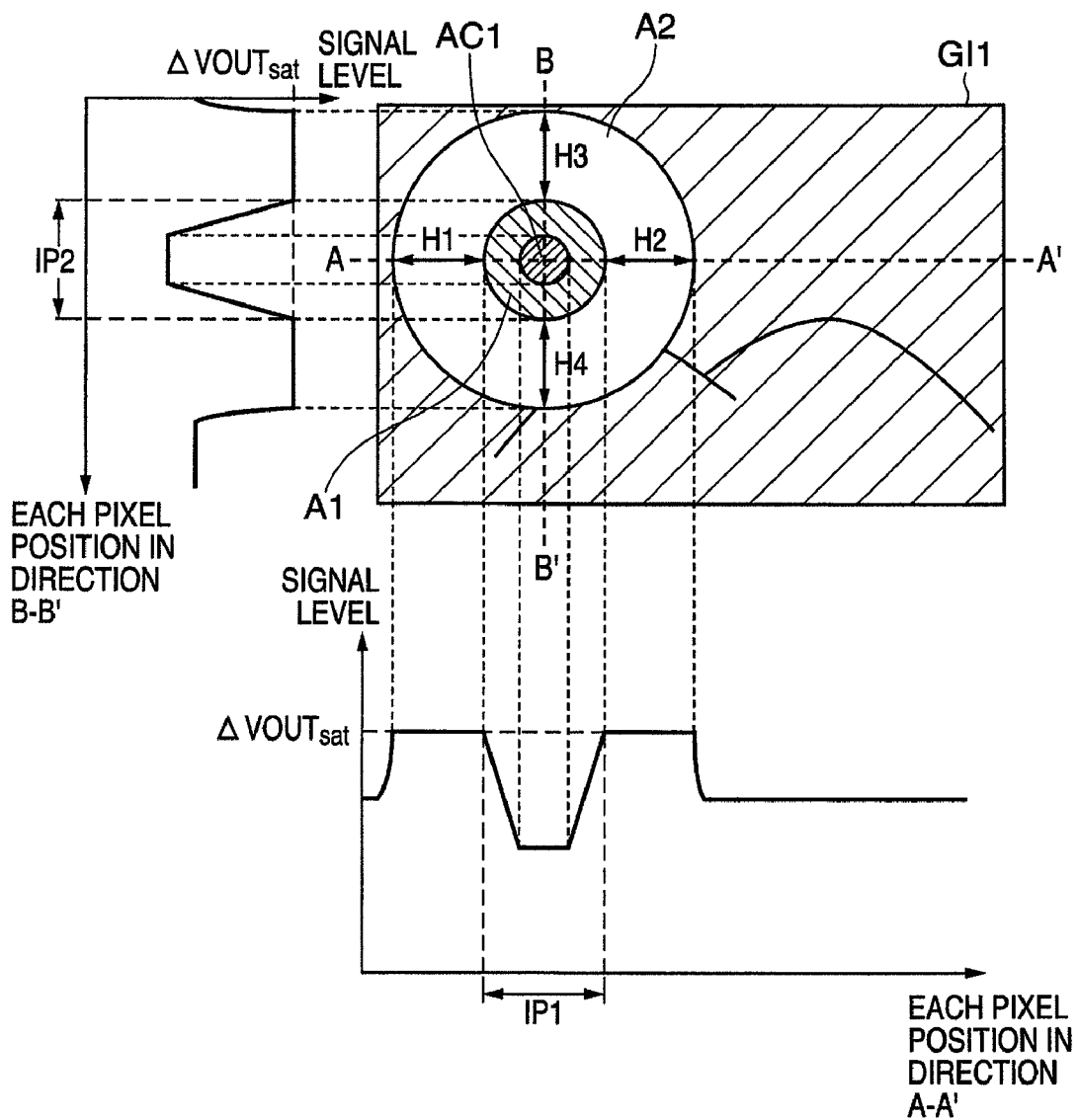
FIG. 7 is a view of an example of an image represented by a 1-frame image signal received by a signal determination unit from a memory.
Figure 8:
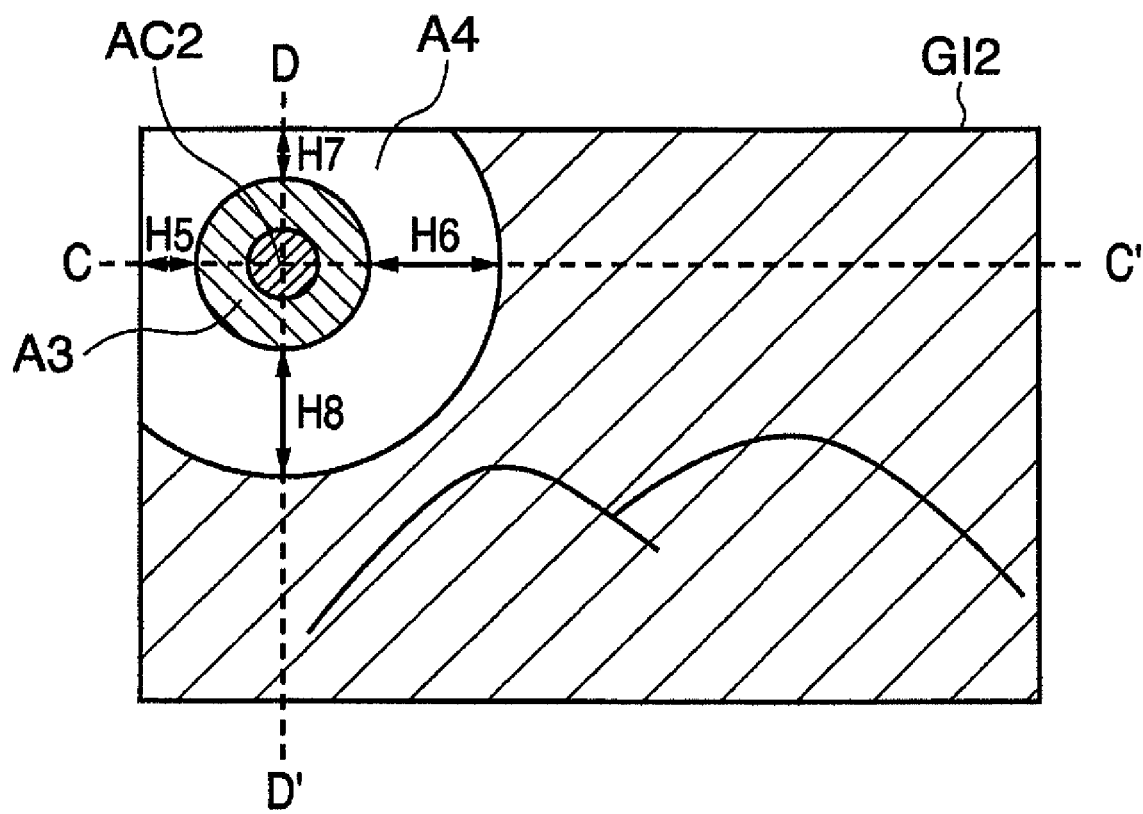
FIG. 8 is a view of an example of the image represented by the 1-frame image signal received by the signal determination unit from the memory.

The detailed operation (signal process) of the signal processor will be explained with reference to FIGS. 6 to 8. FIG. 6 is a flowchart showing the operation of the signal processor. FIGS. 7 and 8 show examples of an image represented by a 1-frame image signal received by the signal determination unit from the memory 5. In FIGS. 7 and 8, the color density represents the signal level of each pixel.

In step S1, the signal determination unit 11 of the signal processor 10 stores the image signal (digital signal) of each pixel received from the ADC 4 in the memory 5. The signal determination unit 11 acquires a 1-frame image signal (digital signal) from the memory 5.

In step S2, the signal determination unit 11 of the signal processor 10 recognizes saturated and desaturated regions (recognition step), and determines whether an image represented by the 1-frame image signal contains an annular region (signal determination step). The annular region is a saturated region sandwiched between outer and inner desaturated regions. The saturated region is a region (white region) where the image signal ΔVOUT reaches the saturation signal amount $\Delta VOUT_{sat}$ (see FIG. 5). The desaturated region is a region (non-white region) where the image signal ΔVOUT does not reach the saturation signal amount $\Delta VOUT_{sat}$ (see FIG. 5).

Assume that the 1-frame image signal received by the signal determination unit 11 from the memory 5 represents an image GI1 in FIG. 7. In this case, a region A2 is a saturated region sandwiched between outer and inner desaturated regions, and is an annular region. The signal determination unit 11 determines that the image GI1 contains an annular region.

Assume that the 1-frame image signal received by the signal determination unit 11 from the memory 5 represents an image GI2 in FIG. 8. In this case, a desaturated region exists inside a region A4, but part of the periphery of the region A4 is not a desaturated region, and the region A4 is not an annular region. The signal determination unit 11 determines that the image GI2 does not contain an annular region.

If the signal determination unit 11 determines that the image represented by the 1-frame image signal contains an annular region, the process advances to step S4. If the signal determination unit 11 determines that the image represented by the 1-frame image signal does not contain an annular region, the process advances to step S3.

In step S3, the signal determination unit 11 of the signal processor 10 determines whether a inner region exists in the image (see, e.g., FIG. 8) represented by the 1-frame image signal. The inner region is a desaturated region surrounded by a saturated region.

Assume that the 1-frame image signal received by the signal determination unit 11 from the memory 5 represents the image GI2 in FIG. 8. In this case, a region A3 is a desaturated region surrounded by a saturated region, and is an inner region. The signal determination unit 11 determines that the image GI2 has an inner region.

If the signal determination unit 11 determines that the image represented by the 1-frame image signal has an inner region, the process advances to step S4. If the signal determination unit 11 determines that the image represented by the 1-frame image signal does not have an inner region, the process ends.

In step S4, the signal determination unit 11 of the signal processor 10 extracts position information of respective pixels in the inner region from the 1-frame image signal. The signal determination unit 11 calculates the position of the center of gravity of the inner region on the basis of the position information of respective pixels in the inner region.

Assume that the 1-frame image signal received by the signal determination unit 11 from the memory 5 represents the image GI1 in FIG. 7. In this case, the signal determination unit 11 calculates the position of the center AC1 of gravity.

Assume that the 1-frame image signal received by the signal determination unit 11 from the memory 5 represents the image GI2 in FIG. 8. In this case, the signal determination unit 11 calculates the position of the center AC2 of gravity.

In step S5, the signal determination unit 11 of the signal processor 10 specifies a determination direction group. The determination direction group is a set of determination directions. The determination direction is a linear direction passing through the center of gravity and crossing a saturated region toward a desaturated region.

Assume that the 1-frame image signal received by the signal determination unit 11 from the memory 5 represents the image GI1 in FIG. 7. In this case, the signal determination unit 11 specifies directions A-A' and B-B' as a determination direction group.

Assume that the 1-frame image signal received by the signal determination unit 11 from the memory 5 represents the image GI2 in FIG. 8. In this case, the signal determination unit 11 specifies directions C-C' and D-D' as a determination direction group.

In step S6, the signal determination unit 11 of the signal processor 10 determines whether the widths of the saturated region in the respective determination directions are equal to each other. That is, the signal determination unit 11 specifies the width of the saturated region in each determination direction at a portion where the saturated region around the inner region contacts the inner region and the outer desaturated region. The signal determination unit 11 compares the widths of the saturated region in the respective determination directions, and determines whether these widths are equal to each other. The signal determination unit 11 outputs the 1-frame image signal (digital signal) and the determination result to the signal correction unit 12.

Assume that the 1-frame image signal received by the signal determination unit 11 from the memory 5 represents the image GI1 in FIG. 7. In this case, the signal determination unit 11 specifies a width H1 (or width H2) in the direction A-A' and a width H3 (or width H4) in the direction B-B' as the widths of the saturated region. The signal determination unit 11 determines whether the width H1 (or width H2) is equal to the width H3 (or width H4).

Assume that the 1-frame image signal received by the signal determination unit 11 from the memory 5 represents the image GI2 in FIG. 8. In this case, the signal determination unit 11 specifies a width H6 in the direction C-C' and a width H8 in the direction D-D' as widths of the saturated region. The signal determination unit 11 determines whether the width H6 is equal to the width H8. Note that widths H5 and H7 are not those at portions where the saturated region contacts the inner region and the outer desaturated region. Thus, the signal determination unit 11 determines that the saturated region is interrupted midway, and does not specify the widths H5 and H7 as widths of the saturated region.

If the signal determination unit 11 determines that the widths of the saturated region in the respective determination directions are equal to each other, it determines that bright light image inversion phenomenon has occurred, and the process advances to step S7. If the signal determination unit 11 determines that the widths of the saturated region in the respective determination directions are not equal to each other, it determines that no bright light image inversion phenomenon has occurred, and the process ends.

In this fashion, it is determined whether the widths of the saturated region in respective determination directions are equal to each other. This can prevent any error in determining whether bright light image inversion phenomenon has occurred.

In step S7, the signal correction unit 12 of the signal processor 10 corrects the 1-frame image signal on the basis of the determination result. More specifically, the signal correction unit 12 corrects the signal level of the image signal of each pixel in the inner region to the saturation signal level $\Delta VOUT_{sat}$, and corrects the gray level of the pixel in the inner region to white. The signal correction unit 12 outputs the corrected image signal to the memory 5 and controller 6.

Meanwhile, the signal correction unit 12 may correct the signal level of the image signal of each pixel in the inner region close to the saturation signal level $\Delta VOUT_{sat}$. For example, the signal correction unit 12 may correct the signal level of the image signal of each pixel in the inner region close to the saturation signal level $\Delta VOUT_{sat}$ by adding a predetermined amount of signal to the signal level. Alternatively, for example, the signal correction unit 12 may correct the signal level of the image signal of each pixel in the inner region close to the saturation signal level $\Delta VOUT_{sat}$ by reducing the difference between the signal level and the saturation signal level $\Delta VOUT_{sat}$ to $1/N$ (N; a natural number).

Assume that the 1-frame image signal received by the signal correction unit 12 from the signal determination unit 11 represents the image GI1 in FIG. 7. In this case, the signal correction unit 12 corrects the signal level of the image signal of each pixel in a region A1 serving as the inner region to the saturation signal level $\Delta VOUT_{sat}$, and corrects the gray level of the pixel in the region A1 to white. For example, the signal correction unit 12 raises the signal level of each pixel in a pixel region IP1 in the direction A-A' to $\Delta VOUT_{sat}$. For example, the signal correction unit 12 raises the signal level of each pixel in a pixel region IP2 in the direction B-B' to $\Delta VOUT_{sat}$.

This embodiment (the first embodiment) can suppress image degradation and reduce the influence of bright light image inversion phenomenon. Meanwhile, although, in the first embodiment, a signal is corrected on the basis of the result from the signal determination unit 11, the signal correction unit 12 may be omitted. In this case, when the signal determination unit determines that bright light image inversion phenomenon has occurred, the image is not used. This modified embodiment can also reduce the influence of bright light image inversion phenomenon, as the first embodiment can.

In addition, the determination direction group may be a set of two determination directions, as shown in FIGS. 7 and 8, or a set of much more (four or eight) determination directions. As the number of determination directions in the determination direction group becomes larger, generation of bright light image inversion phenomenon can be determined more accurately.

Figure 9:
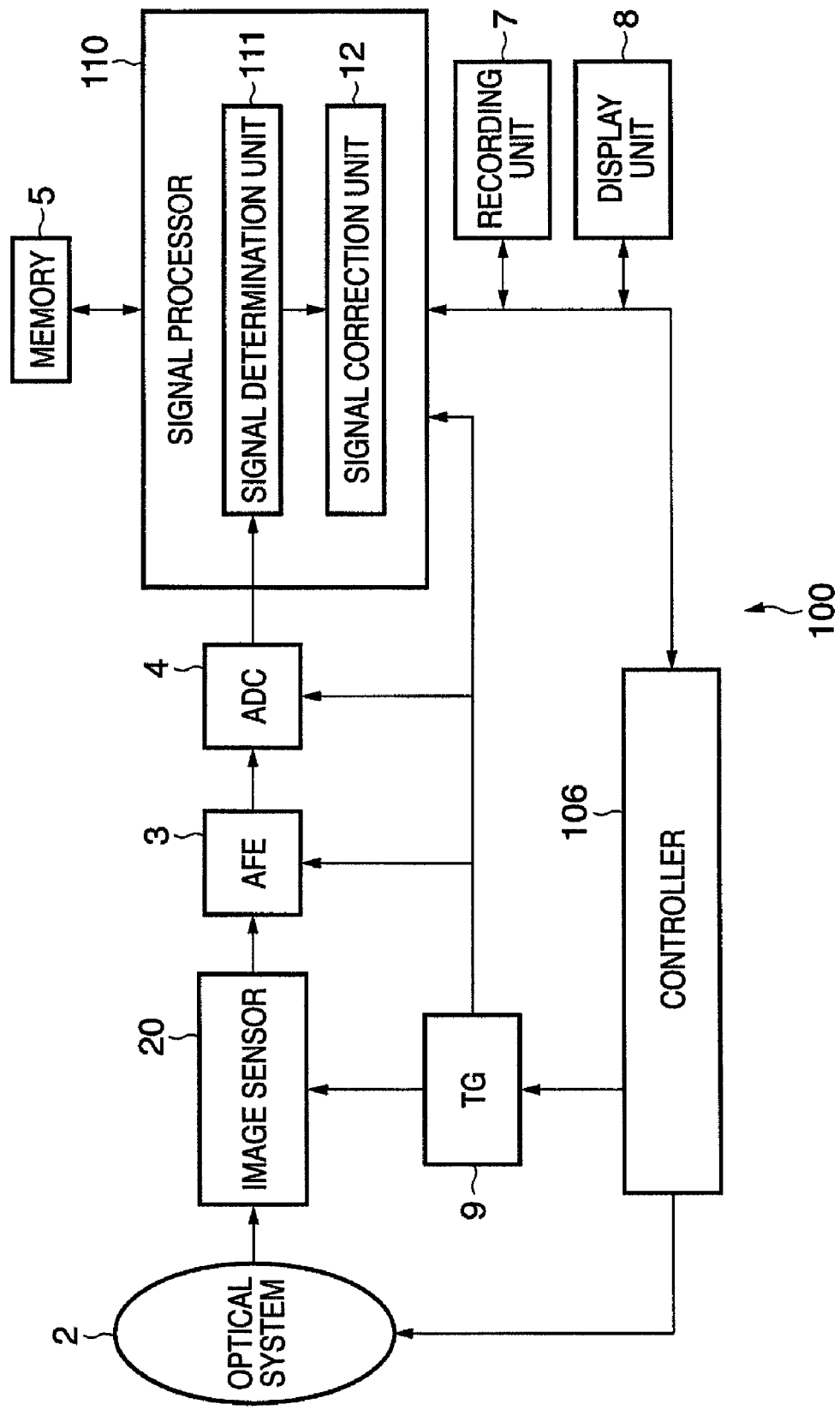
FIG. 9 is a block diagram of the configuration of an image sensing system according to the second embodiment.

An image sensing system according to the second embodiment of the present invention will be described with reference to FIG. 9. FIG. 9 is a block diagram of the configuration of the image sensing system according to the second embodiment. A description of the same part as that in the first embodiment will not be repeated, and a difference will be mainly explained.

The basic configuration of an image sensing system 100 is the same as that in the first embodiment. The second embodiment is different from the first embodiment in that the image sensing system 100 comprises a signal processor 110 instead of the signal processor 10 and a controller 106 instead of the controller 6.

The signal processor 110 includes a signal determination unit 111 instead of the signal determination unit 11. The signal determination unit 111 is connected to an ADC 4, a memory 5, the controller 106, and a signal correction unit 12.

Figure 10:
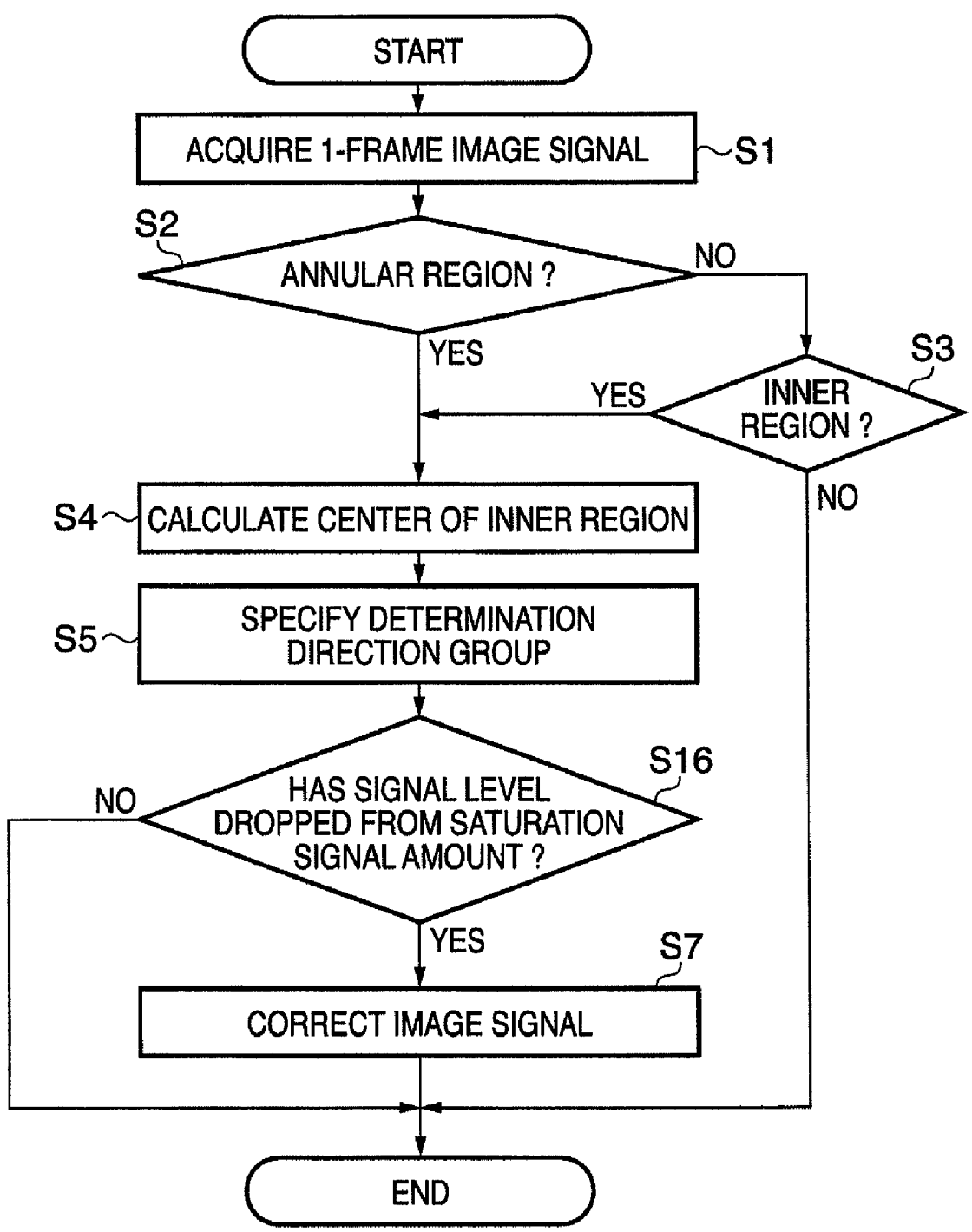
FIG. 10 is a flowchart showing the operation of a signal processor.
Figure 11:
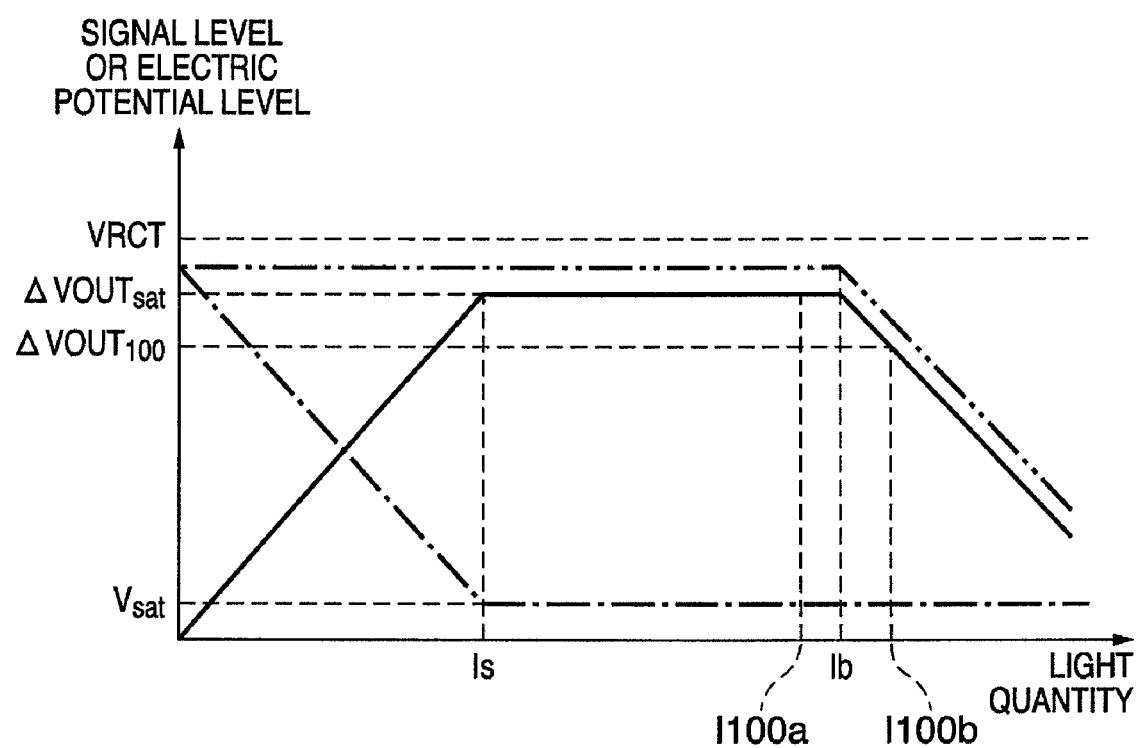
FIG. 11 is a graph showing the relationship between the signal level and the light quantity.
Figure 12:
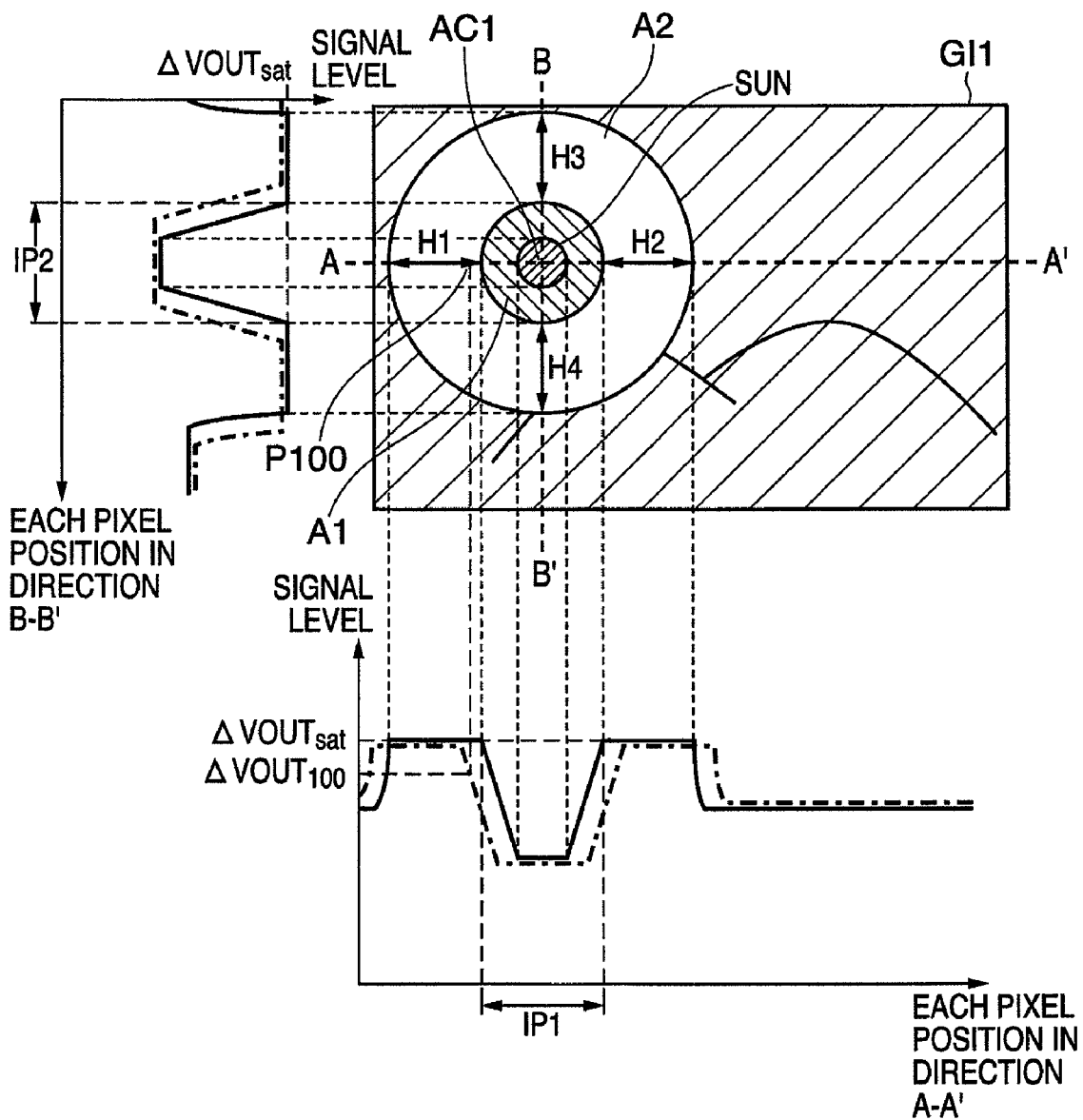
FIG. 12 is a view of an example of an image represented by a 1-frame image signal received by a signal determination unit from a memory.

The operation of the signal processor 110 is different from that in the first embodiment, as shown in FIGS. 10 to 12. FIG. 10 is a flowchart showing the operation of the signal processor. FIG. 11 is a graph showing the relationship between the signal level and the light quantity. FIG. 12 shows an example of an image represented by a 1-frame image signal received by the signal determination unit from the memory 5. In FIG. 10, the same step numbers denote the same processes as those in FIG. 6.

In step S16, the signal determination unit 111 of the signal processor 110 determines whether the signal level of a saturated region around an inner region has dropped from the saturation signal amount $\Delta VOUT_{sat}$ when the exposure amount increases.

More specifically, the signal determination unit 111 transfers a request to the controller 106 to increase the exposure amount after storing the position of the inner region in the memory 5. Based on the request, the controller 106 controls the stop of an optical system 2 to increase the opening degree of the stop. After controlling the stop, the controller 106 sends back to the signal determination unit 111a response representing that the stop has been controlled. Upon receiving the response, the signal determination unit 111 acquires, from the memory 5, information on the position of the inner region and a 1-frame image signal obtained after increasing the exposure amount. Based on the information on the position of the inner region and the 1-frame image signal obtained after increasing the exposure amount, the signal determination unit 111 determines whether the signal level of the saturated region around the inner region has dropped from the saturation signal amount $\Delta VOUT_{sat}$.

For example, as shown in FIG. 11, the light quantity of a pixel (e.g., a pixel P100 shown in FIG. 12) in the saturated region around the inner region is the light quantity I100a slightly smaller than the image inversion light quantity Ib before the aperture of the stop of the optical system 2 is widened. The signal level of the saturated region around the inner region is the saturation signal amount $\Delta VOUT_{sat}$. That is, each pixel in the direction A-A' has a signal level indicated by the solid line, as shown in FIG. 12. The signal level of the pixel P100 is the saturation signal amount $\Delta VOUT_{sat}$.

After the aperture of the stop of the optical system 2 is widened, the light quantity of a pixel (e.g., the pixel P100 shown in FIG. 12) in the saturated region around the inner region becomes the light quantity I100b slightly larger than the image inversion light quantity Ib. The signal level of the saturated region around the inner region drops from the saturation signal amount $\Delta VOUT_{sat}$. That is, each pixel in the direction A-A' has a signal level indicated by the chain line, as shown in FIG. 12. The signal level of the pixel P100 is the signal amount $\Delta VOUT_{100}$ which is smaller than the saturation signal amount $\Delta VOUT_{sat}$.

If the signal determination unit 111 determines that the signal level of the saturated region around the inner region has dropped from the saturation signal amount $\Delta VOUT_{sat}$, it determines that bright light image inversion phenomenon has occurred, and the process advances to step S7. If the signal determination unit 111 determines that the signal level of the saturated region around the inner region does not drop from the saturation signal amount $\Delta VOUT_{sat}$, it determines that no bright light image inversion phenomenon has occurred, and the process ends.

As described above, it is determined whether the signal level of the saturated region around the inner region has dropped from the saturation signal amount $\Delta VOUT_{sat}$ when the exposure amount is increased. This can prevent any error in determining whether bright light image inversion phenomenon has occurred.

Meanwhile, the signal determination unit 111 of the signal processor 110 may determine whether the signal level of the region inside the saturated region has risen to the saturation signal amount $\Delta VOUT_{sat}$ when the exposure amount is decreased. In this case, for example, when the quantity of light incident on the pixel P100 shown in FIG. 12 changes from the light quantity I100b to the light quantity I100a shown in FIG. 11, it is confirmed that the signal level has changed from $\Delta VOUT_{100}$ to $\Delta VOUT_{sat}$.

Figure 13:
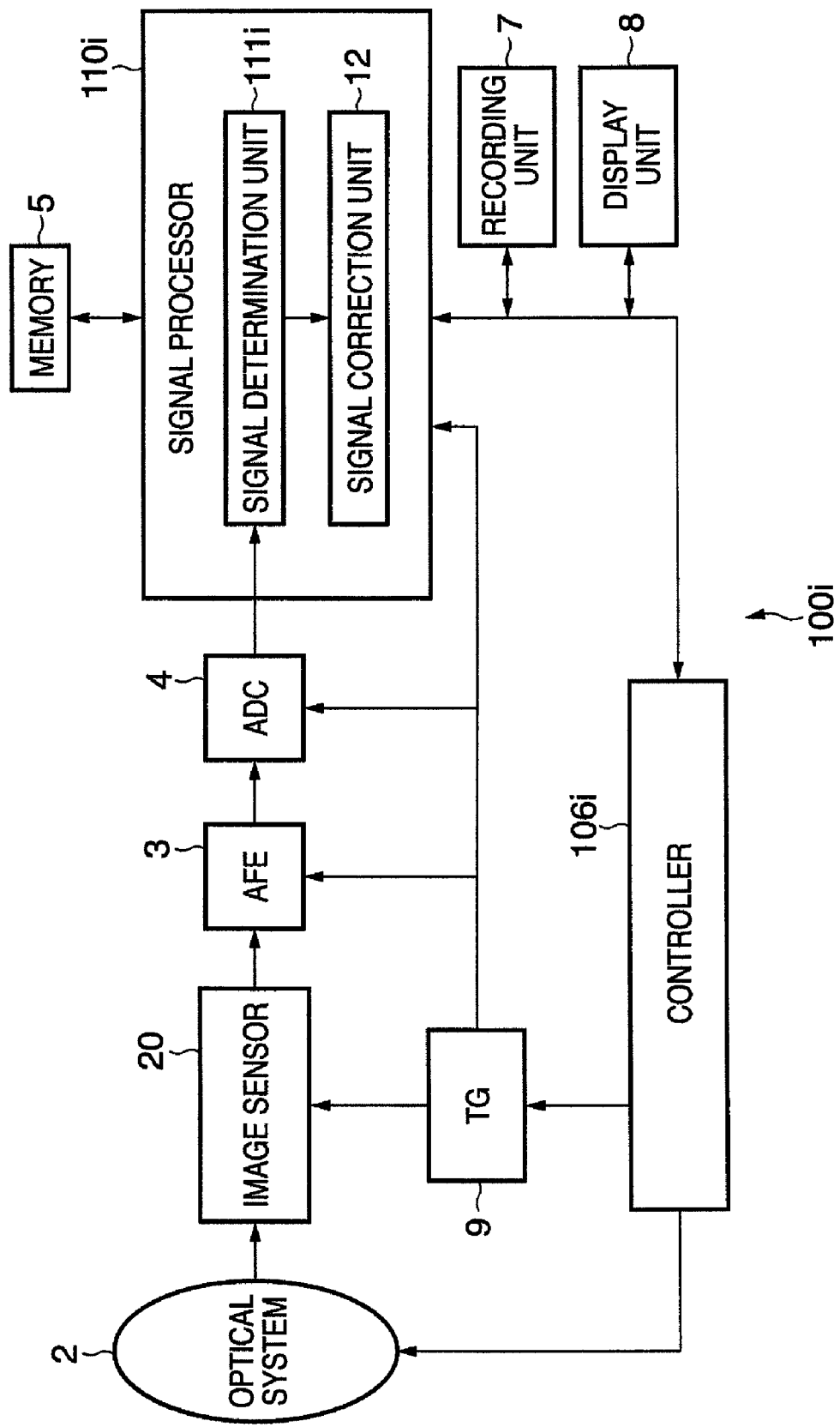
FIG. 13 is a block diagram of the configuration of an image sensing system according to a modification to the second embodiment.
Figure 14:
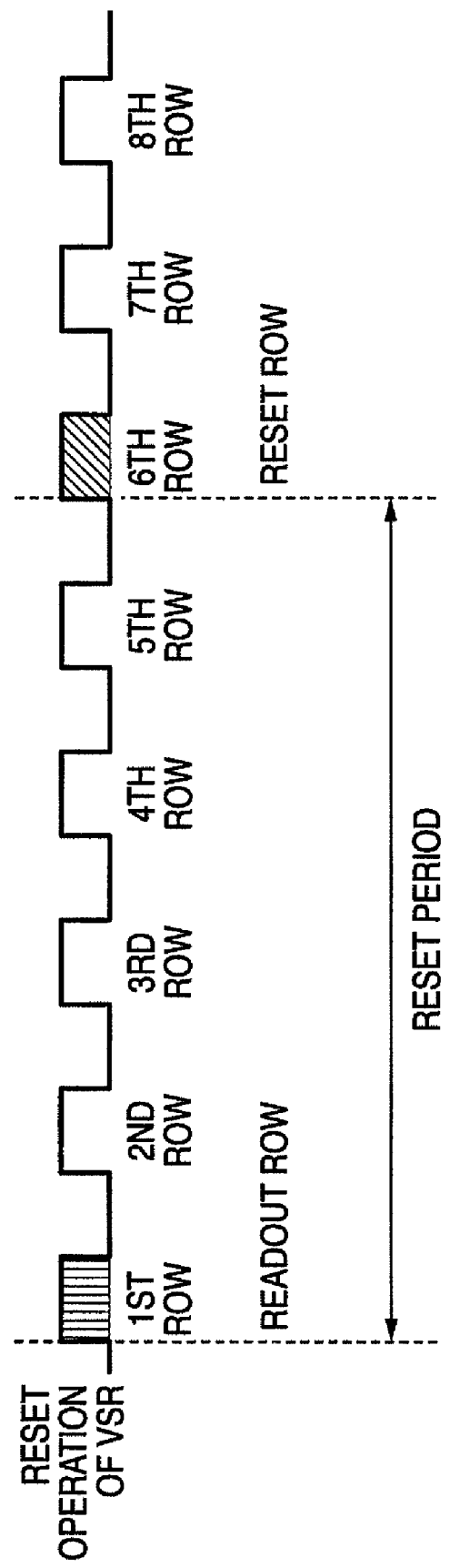
FIG. 14 is a chart for explaining the reset period.

Alternatively, in an image sensing system 100i (see FIG. 13) according to a modification to the second embodiment, a signal determination unit 111i of a signal processor 110i may make determination when the exposure time is prolonged, instead of making determination when the exposure amount is increased. In this case, a controller 106i controls a TG 9 to prolong the clock period or the reset period of an image sensor 20 on the basis of a request to prolong the exposure time (see FIG. 14), thereby prolonging the exposure time. The light quantity becomes larger as the exposure time becomes longer, so the remaining operation of the signal processor is the same as that when the exposure amount is increased.

Figure 15:
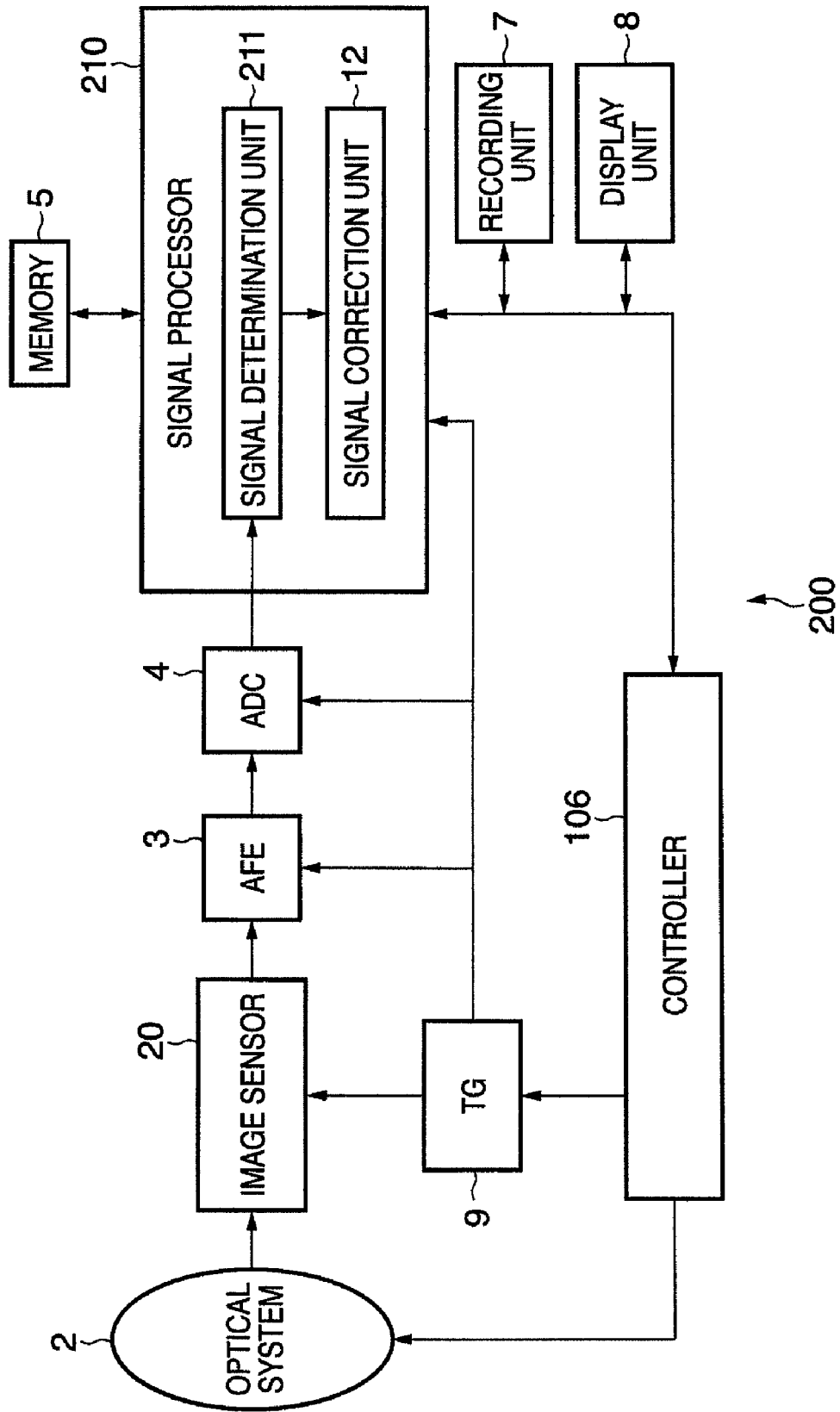
FIG. 15 is a block diagram of the configuration of an image sensing system according to the third embodiment.

An image sensing system according to the third embodiment of the present invention will be described with reference to FIG. 15. FIG. 15 is a block diagram of the configuration of the image sensing system according to the third embodiment. A description of the same part as that in the first embodiment will not be repeated, and a difference will be mainly explained.

The basic configuration of an image sensing system 200 is the same as that in the first embodiment. The third embodiment is different from the first embodiment in that the image sensing system 200 comprises a signal processor 210 instead of the signal processor 10.

The signal processor 210 includes a signal determination unit 211 instead of the signal determination unit 11.

Figure 16:
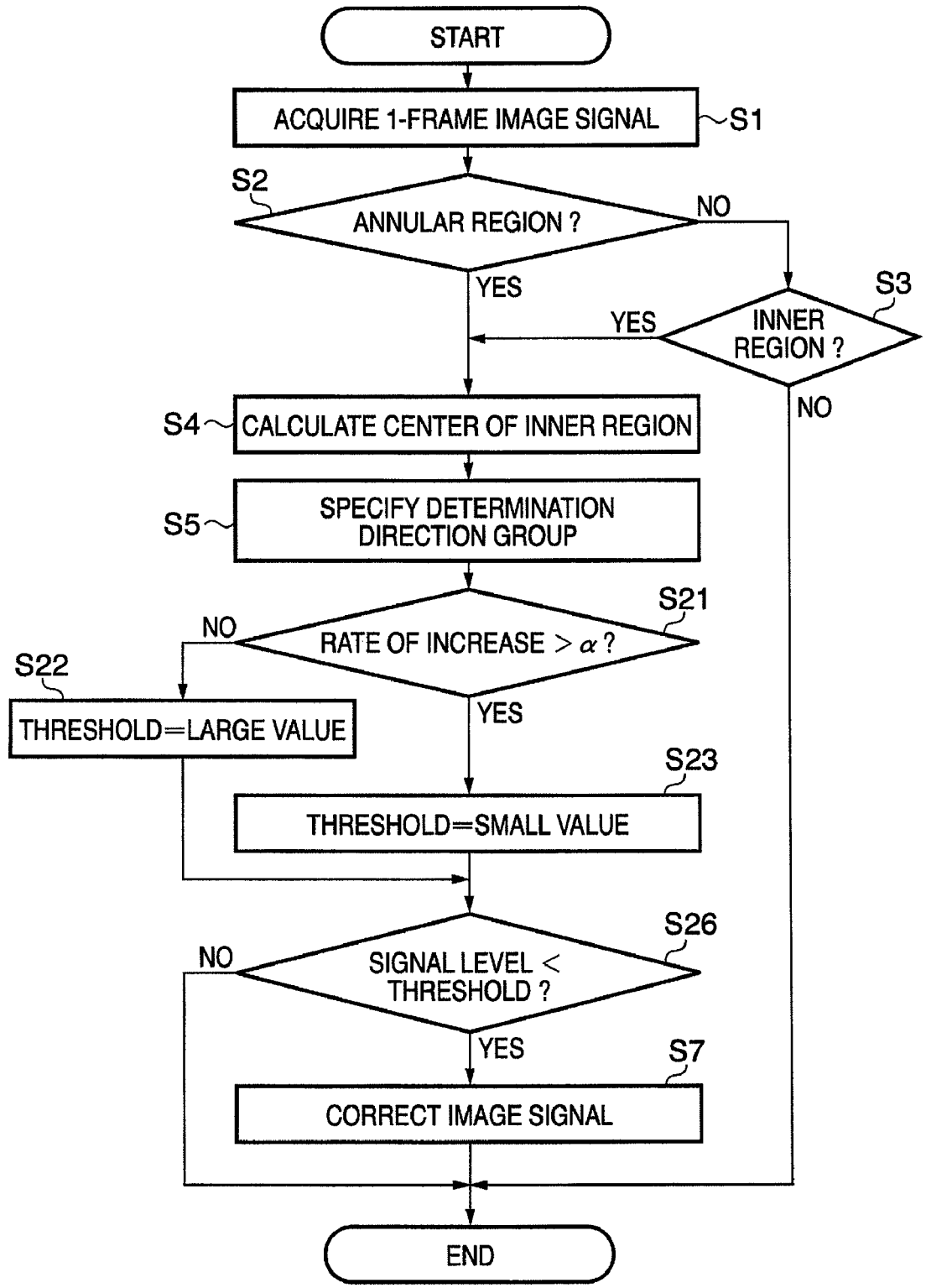
FIG. 16 is a flowchart showing the operation of a signal processor.
Figure 17:
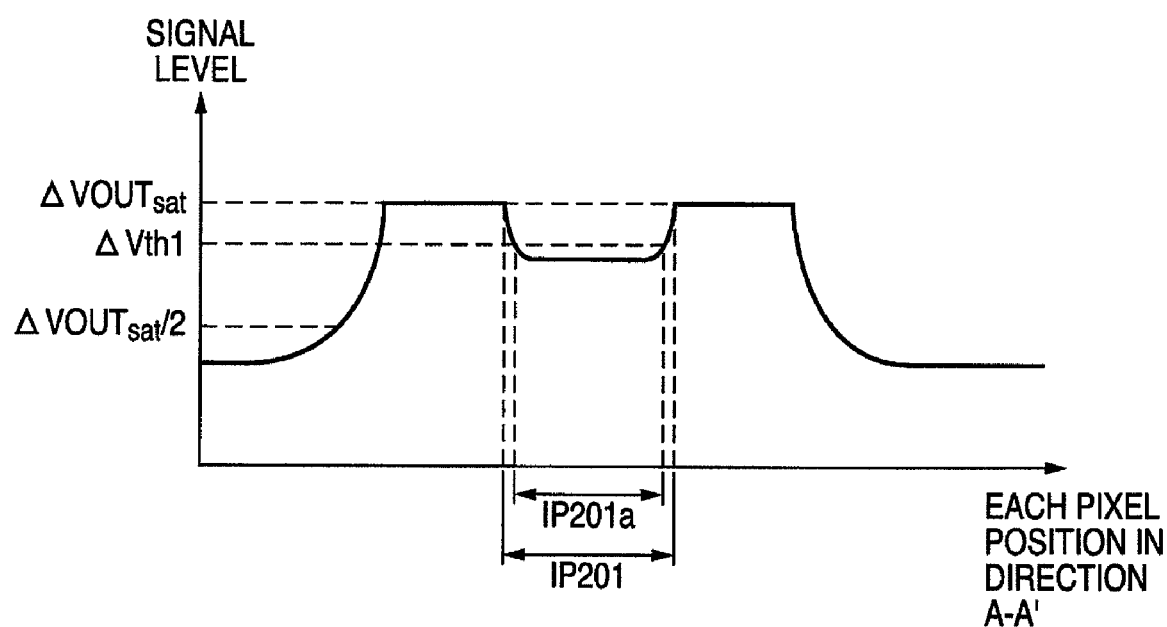
FIG. 17 is a graph showing the relationship between the signal level and each pixel position in the direction A-A'.
Figure 18:
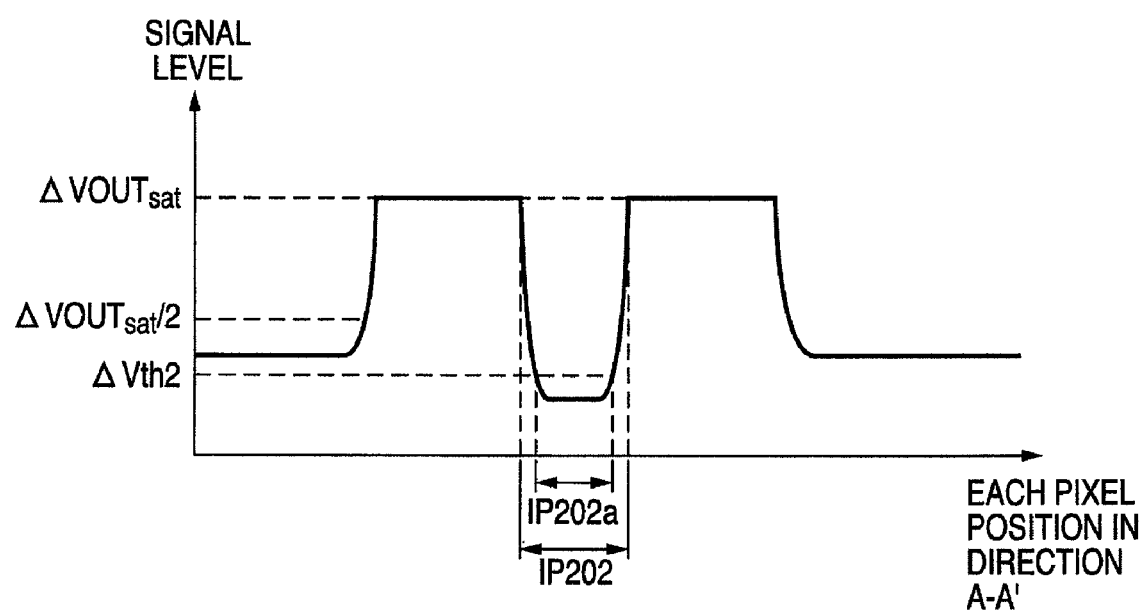
FIG. 18 is a graph showing the relationship between the signal level and each pixel position in the direction A-A'.

The operation of the signal processor 210 is different from that in the first embodiment, as shown in FIGS. 16 to 18. FIG.

16 is a flowchart showing the operation of the signal processor. FIGS. 17 and 18 are graphs showing the relationship between the signal level and each pixel position in the direction A-A' (see FIG. 7). In FIG. 16, the same step numbers denote the same processes as those in FIG. 6.

In step S21, the signal determination unit 211 of the signal processor 210 determines whether the rate of increase of the signal level at the determination signal level is higher than α (first threshold) when coming close to a saturated region around an inner region from outside the saturated region.

Assume that a 1-frame image signal received by the signal determination unit 211 from a memory 5 represents the same image as the image GI1 in FIG. 7. Also assume that the signal level in the direction A-A' is one as shown in FIG. 17. At this time, for example, the signal determination unit 211 determines that the rate of increase of the signal level at the determination signal level $\Delta \text{VOUT}_{sat}/2$ is equal to or lower than α.

Assume that the signal level in the direction A-A' is one as shown in FIG. 18. At this time, for example, the signal determination unit 211 determines that the rate of increase of the signal level at the determination signal level $\Delta \text{VOUT}_{sat}/2$ is higher than α.

If the signal determination unit 211 determines that the rate of increase of the determination signal level is higher than α, it determines that the object is extremely bright, and the process advances to step S23. If the signal determination unit 211 determines that the rate of increase of the determination signal level is equal to or lower than α, it determines that the object is not very bright, and the process advances to step S22.

Since the signal determination unit 211 of the signal processor 210 determines that the object is not very bright, it sets a threshold for determining the inner region to a large value (loose value) in step S22.

Assume that the 1-frame image signal received by the signal determination unit 211 from the memory 5 represents the same image as the image GI1 in FIG. 7. Also assume that the signal level in the direction A-A' is one as shown in FIG. 17. At this time, for example, the signal determination unit 211 sets a threshold for determining an inner region IP201 to ΔVth1 (large value).

Since the signal determination unit 211 of the signal processor 210 determines that the object is extremely bright, it sets the threshold for determining the inner region to a small value (strict value) in step S23.

Assume that the 1-frame image signal received by the signal determination unit 211 from the memory 5 represents the same image as the image GI1 in FIG. 7. Also assume that the signal level in the direction A-A' is one as shown in FIG. 18. At this time, for example, the signal determination unit 211 sets a threshold for determining an inner region IP202 to ΔVth2 (small value).

In step S26, the signal determination unit 211 of the signal processor 210 determines whether the inner region contains a region where the signal level is equal to or lower than the threshold.

Assume that the 1-frame image signal received by the signal determination unit 211 from the memory 5 represents the same image as the image GI1 in FIG. 7. Also assume that the signal level in the direction A-A' is one as shown in FIG. 17. At this time, for example, the inner region IP201 contains a region IP201a where the signal level is equal to or lower than the threshold ΔVth1. The signal determination unit 211 determines that the inner region IP201 contains a region where the signal level is equal to or lower than the threshold ΔVth1.

Assume that the 1-frame image signal received by the signal determination unit 211 from the memory 5 represents the same image as the image GI1 in FIG. 7. Also assume that the signal level in the direction A-A' is one as shown in FIG. 18. At this time, for example, the inner region IP202 contains a region IP202a where the signal level is equal to or lower than the threshold ΔVth2. The signal determination unit 211 determines that the inner region IP202 contains a region where the signal level is equal to or lower than the threshold ΔVth2.

If the signal determination unit 211 determines that the inner region contains a region where the signal level is equal to or lower than the threshold, it determines that bright light image inversion phenomenon has occurred, and the process advances to step S7. If the signal determination unit 211 determines that the inner region does not contain a region where the signal level is equal to or lower than the threshold, it determines that no bright light image inversion phenomenon has occurred, and the process ends.

In this manner, it is determined whether the rate of increase of the signal level at the determination signal level is higher than α when coming close to a saturated region around an inner region from outside the saturated region. This can prevent any error in determining whether bright light image inversion phenomenon has occurred.

Meanwhile, the signal determination unit 211 may determine whether the decrease rate of the signal level at the determination signal level is higher than α when moving apart from outside a saturated region around an inner region.

The signal determination unit 211 may reduce the threshold for determining an inner region when the rate of increase rises, and may increase it when the rate of increase drops.

Figure 19:
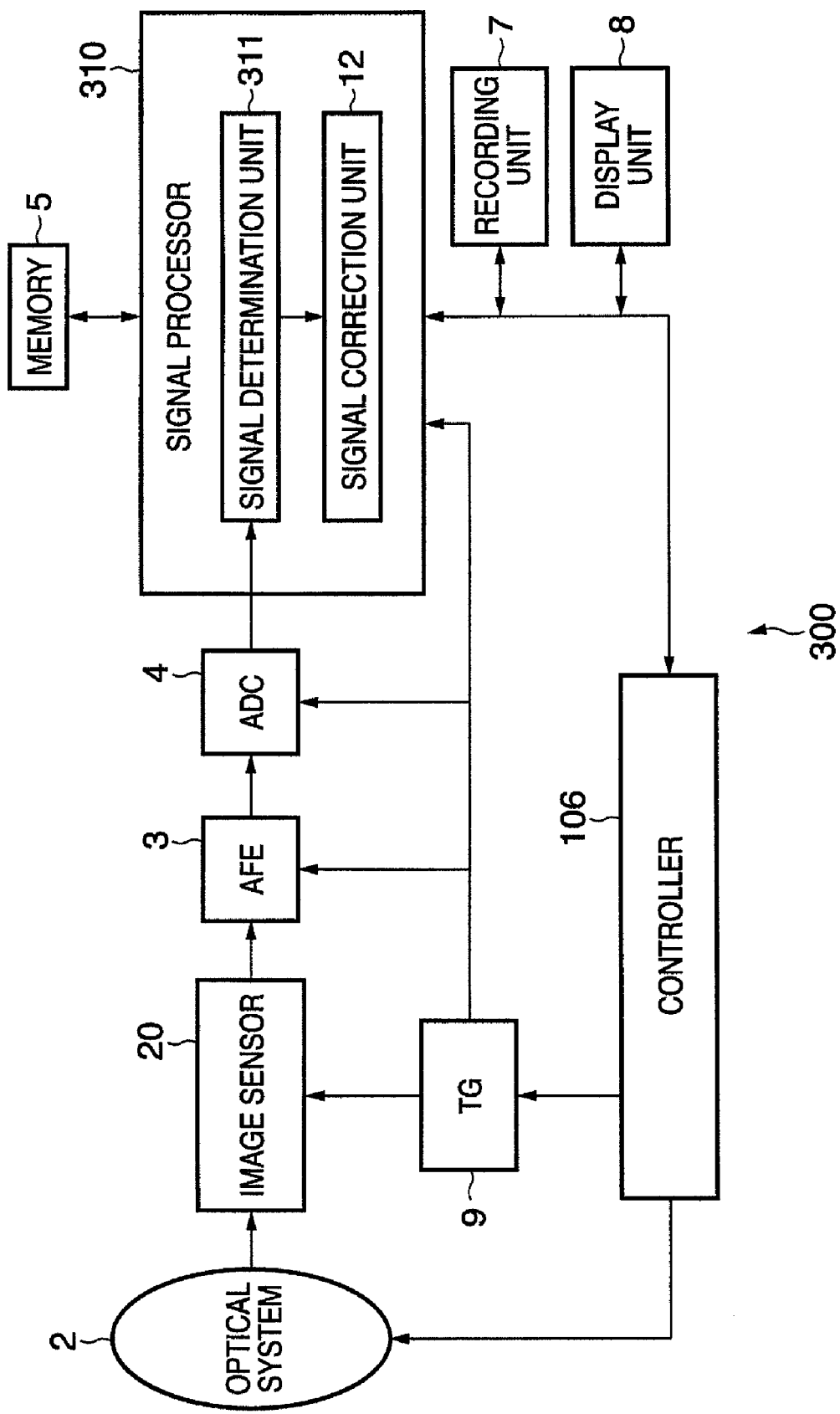
FIG. 19 is a block diagram of the configuration of an image sensing system according to the fourth embodiment.

An image sensing system according to the fourth embodiment of the present invention will be described with reference to FIG. 19. FIG. 19 is a block diagram of the configuration of the image sensing system according to the fourth embodiment. A description of the same part as those in the first and third embodiments will not be repeated, and a difference will be mainly explained.

The basic configuration of an image sensing system 300 is the same as those in the first and third embodiments. The fourth embodiment is different from the first and third embodiments in that the image sensing system 300 comprises a signal processor 310 instead of the signal processor 10.

The signal processor 310 includes a signal determination unit 311 instead of the signal determination unit 11.

Figure 20:
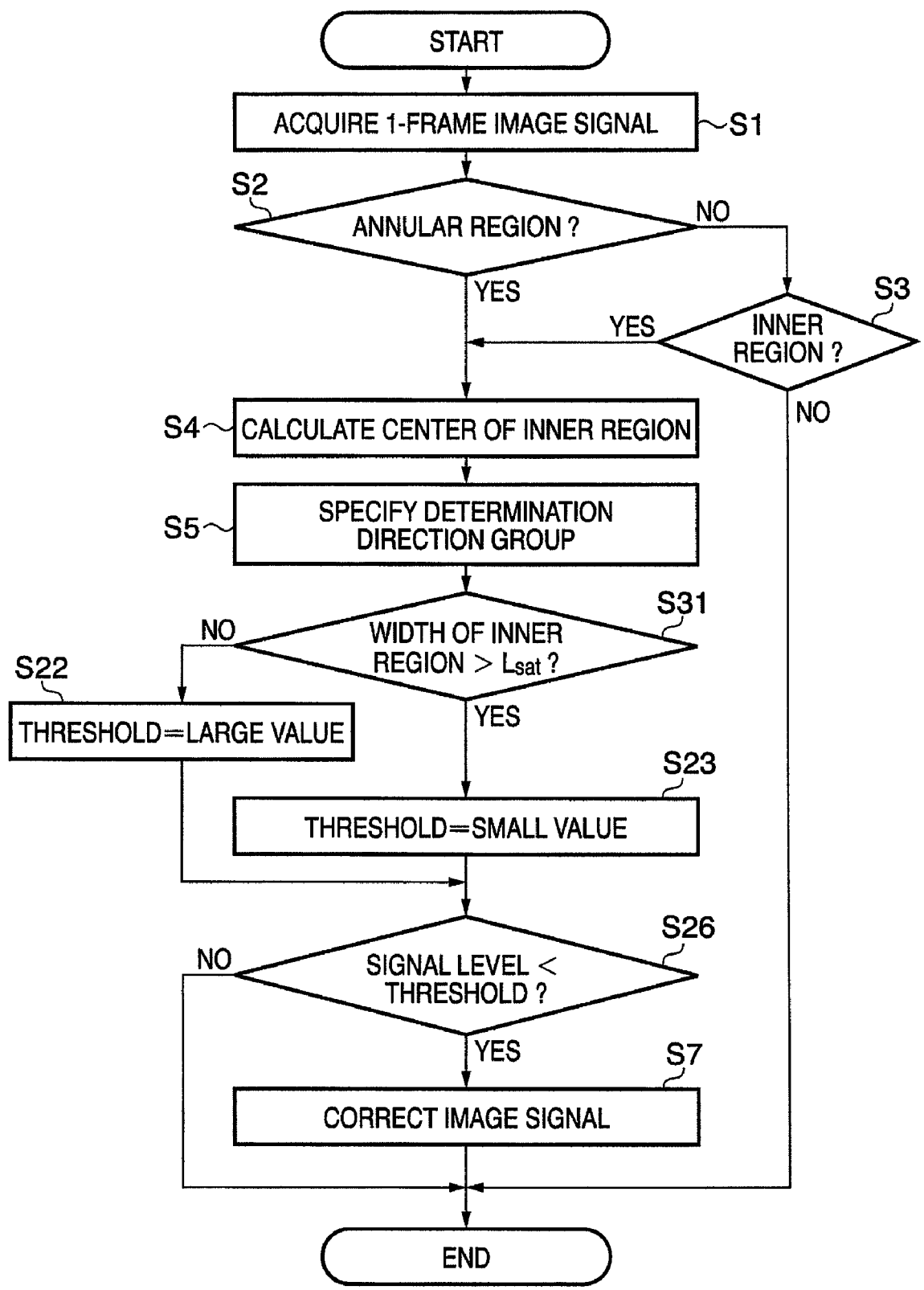
FIG. 20 is a flowchart showing the operation of a signal processor.
Figure 21:
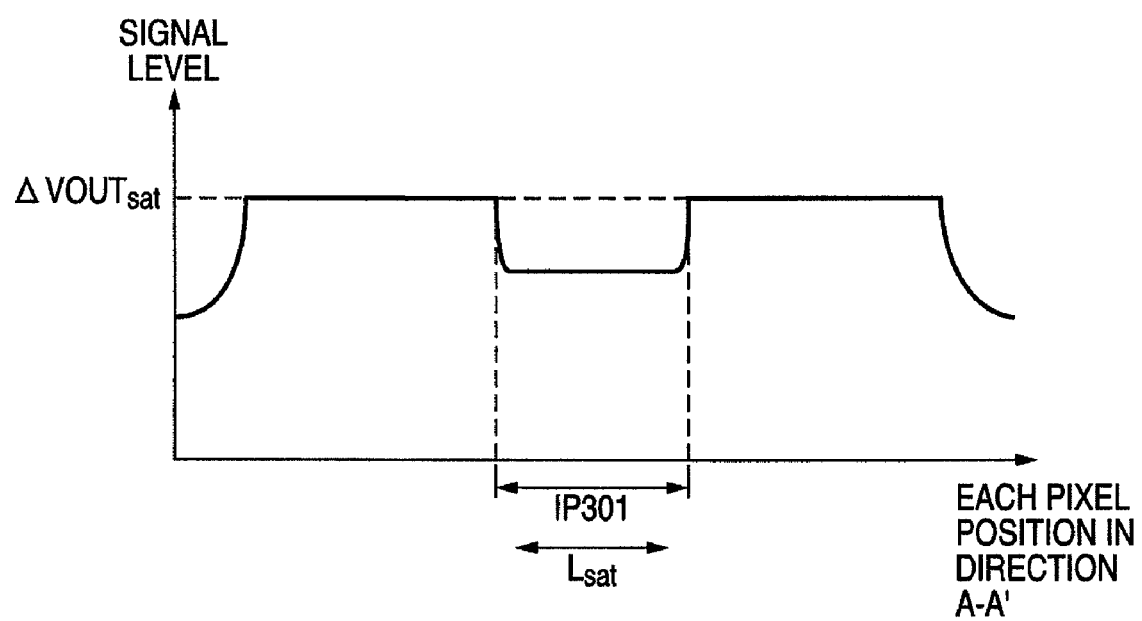
FIG. 21 is a graph showing the relationship between the signal level and each pixel position in the direction A-A'.
Figure 22:
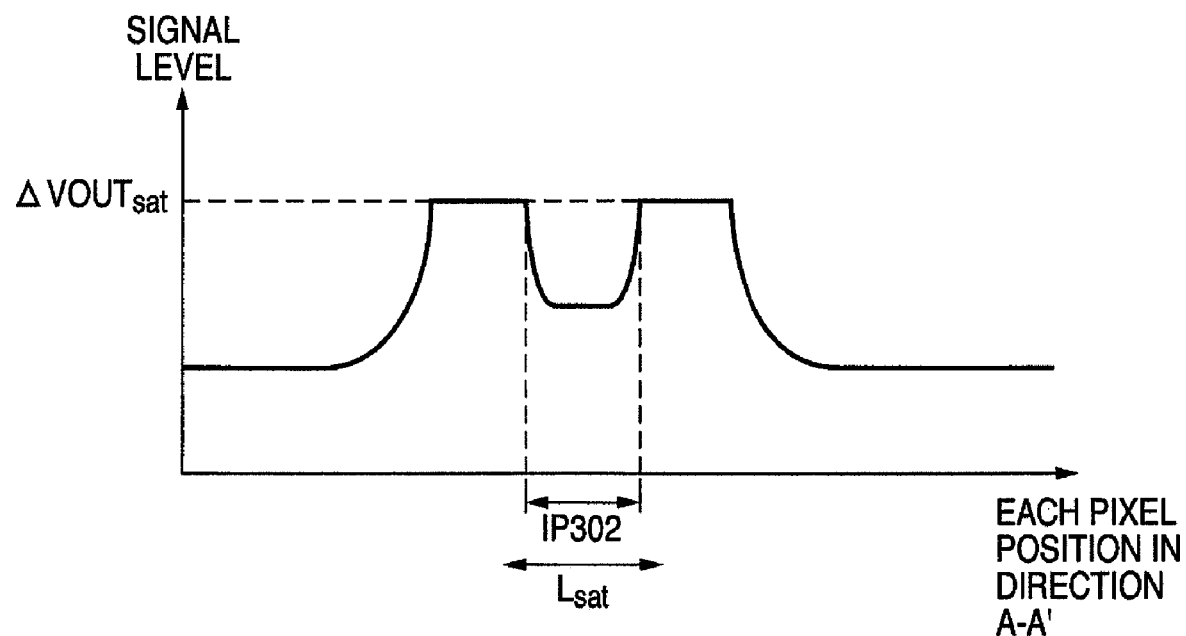
FIG. 22 is a graph showing the relationship between the signal level and each pixel position in the direction A-A'.

The operation of the signal processor 310 is different from those in the first and third embodiments, as shown in FIGS. 20 to 22. FIG. 20 is a flowchart showing the operation of the signal processor. FIGS. 21 and 22 are graphs showing the relationship between the signal level and each pixel position in the direction A-A' (see FIG. 7). In FIG. 20, the same step numbers denote the same processes as those in FIG. 6.

In step S31, the signal determination unit 311 of the signal processor 310 determines whether (the number of pixels at) the width of an inner region is larger than $L_{sat}$ (second threshold).

Assume that a 1-frame image signal received by the signal determination unit 311 from a memory 5 represents the same image as the image GI1 in FIG. 7. Also assume that the signal level in the direction A-A' is one as shown in FIG. 21. At this time, for example, the signal determination unit 311 determines that the width of an inner region IP301 is larger than $L_{sat}$.

Alternatively, assume that the signal level in the direction A-A' is one as shown in FIG. 22. At this time, for example, the signal determination unit 311 determines that (the number of pixels at) the width of the inner region is equal to or smaller than $L_{sat}$.

If the signal determination unit 311 determines that the width of the inner region IP301 is larger than $L_{sat}$, it determines that a light quantity equal to or larger than the bright light image inversion phenomenon light quantity Ib (see FIG. 5) is incident in a wide range, and the process advances to step S23. If the signal determination unit 311 determines that (the number of pixels at) the width of the inner region is equal to or smaller than $L_{sat}$, it determines that a light quantity equal to or larger than the image inversion light quantity Ib (see FIG. 5) is incident locally, and the process advances to step S22.

As described above, it is determined whether (the number of pixels at) the width of the inner region is larger than $L_{sat}$ (second threshold). This can prevent any error in determining whether bright light image inversion phenomenon has occurred.

Figure 23:
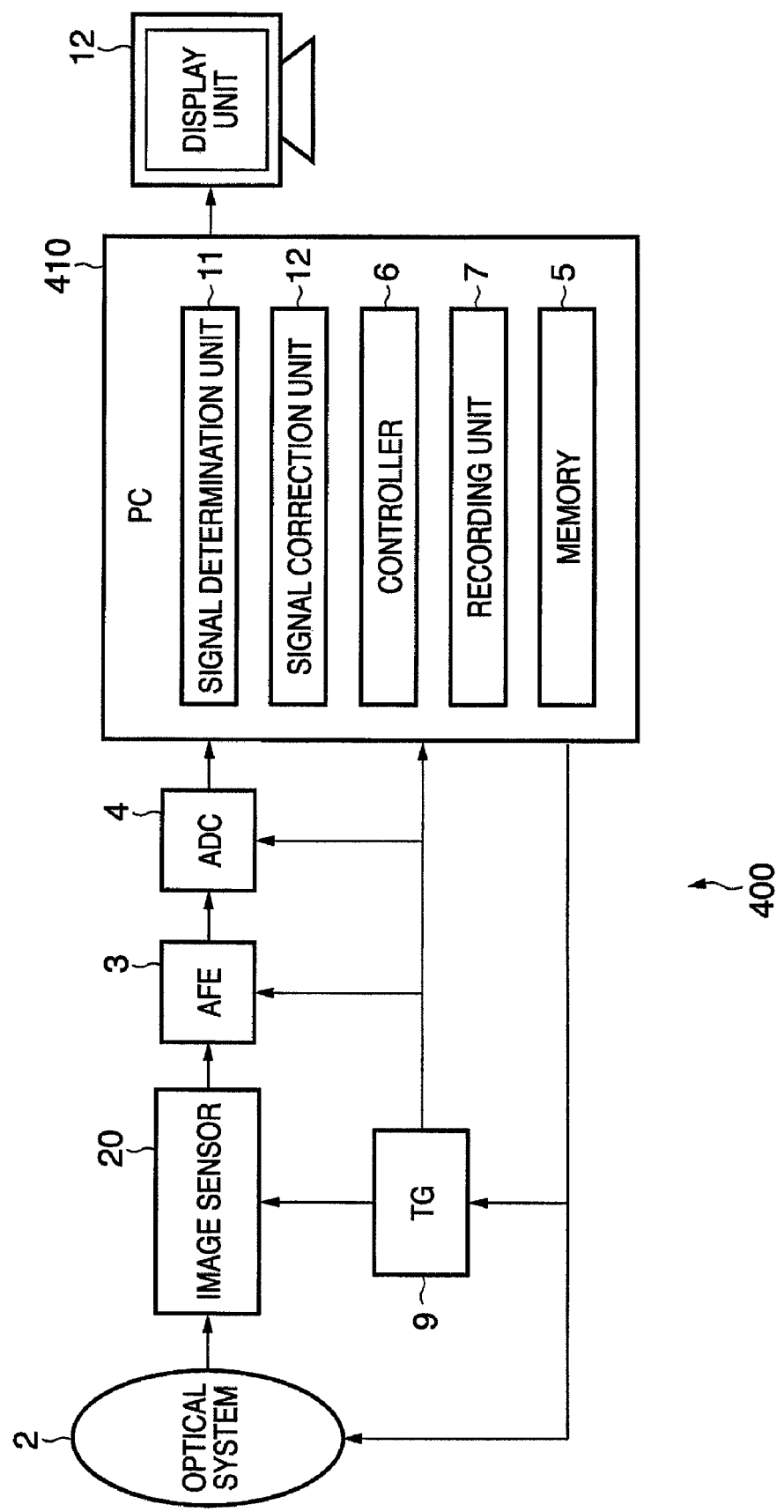
FIG. 23 is a block diagram of the configuration of an image sensing system according to the fifth embodiment.

An image sensing system according to the fifth embodiment of the present invention will be described with reference to FIG. 23. FIG. 23 is a block diagram of the configuration of the image sensing system according to the fifth embodiment. A description of the same part as that in the first embodiment will not be repeated, and a difference will be mainly explained.

The basic configuration of an image sensing system 400 is the same as that in the first embodiment. The fifth embodiment is different from the first embodiment in that the image sensing system 400 comprises a PC (Personal Computer) 410 instead of the signal processor 10, and the PC 410 includes a signal determination unit 11, a signal correction unit 12, a controller 6, recording unit 7, and memory 5.

The PC 410 includes, as hardware, a CPU which runs at high speed, a hard disk, a large-capacity external storage such as a CD or DVD, and a semiconductor memory capable of storage at high speed. The CPU corresponds to a signal determination unit 11, a signal correction unit 12, and the controller 6. The external storage corresponds to the recording unit 7. The semiconductor memory corresponds to the memory 5.

Since the PC 410 as a general-purpose device is utilized, bright light image inversion phenomenon can be determined and corrected by only adding software functions without adding any hardware dedicated device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216219, filed Aug. 8, 2006 which is hereby incorporated by reference herein in its entirety.

What is claimed is:

1. A signal processing device comprising:
    an image sensor, which outputs a difference signal between a signal level and a noise level output from each of a plurality of pixels; and
    a signal determination unit, which recognizes a saturated region in an image obtained by photoelectric conversion where the signal level is saturated, and a desaturated region in the image where the signal level is not saturated, based on the difference signal output from the image sensor, and which determines whether an inner region, which includes a desaturated region surrounded by a saturated region, exists in the image,
    wherein the signal determination unit determines whether the image includes an annular region, which includes the recognized saturated region, sandwiched between an outer desaturated region and the inner region that includes the desaturated region determined to exist by the signal determination unit.

2. The device according to claim 1, wherein the signal determination unit determines whether a bright light image inversion phenomenon has occurred.

3. The device according to claim 2, further comprising a signal correction unit, which corrects the signal level of the inner region close to a saturation signal level when the signal determination unit determines that the bright light image inversion phenomenon has occurred.

4. The device according to claim 1, wherein the device is incorporated in an image sensing system that includes an optical system that forms an optical image of an object on the image sensor of the device.

5. A signal processing device comprising:
    an image sensor, which outputs a difference signal between a signal level and a noise level output from each of a plurality of pixels; and
    a signal determination unit, which recognizes a saturated region in an image obtained by photoelectric conversion where the signal level is saturated, and a desaturated region in the image where the signal level is not saturated, based on the difference signal output from the image sensor, and which determines whether an inner region, which includes a desaturated region surrounded by a saturated region, exists in the image, wherein the signal determination unit calculates a position of a center of gravity of the inner region, and specifies a determination direction group serving as a set of determination directions each of which is a linear direction passing through the center of gravity and crossing the surrounding saturated region toward the desaturated region.

6. The device according to claim 5, wherein the signal determination unit determines a width of the saturated region in each determination direction of the determination direction group at a portion where the saturated region around the inner region contacts the inner region and an outer desaturated region, determines whether widths of the saturated region in respective determination directions are equal to each other, and, when determining that the widths of the saturated region in the respective determination directions are equal to each other, determines that a bright light image inversion phenomenon has occurred.

7. A signal processing device comprising:
    an image sensor, which outputs a difference signal between a signal level and a noise level output from each of a plurality of pixels; and
    a signal determination unit, which recognizes a saturated region in an image obtained by photoelectric conversion where the signal level is saturated, and a desaturated region in the image where the signal level is not saturated, based on the difference signal output from the image sensor, and which determines whether an inner region, which includes a desaturated region surrounded by a saturated region, exists in the image, wherein the signal determination unit determines whether the signal level of the saturated region around the inner region has dropped from a saturation signal amount when either of an exposure amount and an exposure time is increased.

8. A signal processing device comprising:
    an image sensor, which outputs a difference signal between a signal level and a noise level output from each of a plurality of pixels; and
    a signal determination unit, which recognizes a saturated region in an image obtained by photoelectric conversion where the signal level is saturated, and a desaturated region in the image where the signal level is not saturated, based on the difference signal output from the image sensor, and which determines whether an inner region, which includes a desaturated region surrounded by a saturated region, exists in the image, wherein the signal determination unit determines whether a rate of increase of the signal level at a determination signal level is higher than a first threshold when coming close to the saturated region around the inner region outside from the saturated region.

9. A signal processing device comprising:
an image sensor, which outputs a difference signal between a signal level and a noise level output from each of a plurality of pixels; and
a signal determination unit, which recognizes a saturated region in an image obtained by photoelectric conversion where the signal level is saturated, and a desaturated region in the image where the signal level is not saturated, based on the difference signal output from the image sensor, and which determines whether an inner region, which includes a desaturated region surrounded by a saturated region, exists in the image, wherein the signal determination unit determines whether a width of the inner region is larger than a second threshold.

10. A signal processing method comprising steps of:
outputting a difference signal between a signal level and a noise level output from each of plurality of pixels;
recognizing a saturated region in an image obtained by photoelectric conversion where the signal level is saturated, and a desaturated region in the image where the signal level is not saturated, based on the difference signal output in the outputting step; and
determining whether an inner region, which includes a desaturated region surrounded by a saturated region, exists in the image,
wherein the determining step also determines whether the image includes an annular region, which includes the recognized saturated region, sandwiched between an outer desaturated region and the inner region that includes the desaturated region determined to exist by the determining step.

11. The method according to claim 10, wherein the determining step includes determining whether a bright light image inversion phenomenon has occurred.

12. The method according to claim 11, further comprising correcting the signal level of the inner region close to a saturation signal level, when it is determined in the determining step that the bright light image inversion phenomenon has occurred.

13. A signal processing method comprising steps of:
outputting a difference signal between a signal level and a noise level output from each of plurality of pixels;
recognizing a saturated region in an image obtained by photoelectric conversion where the signal level is saturated, and a desaturated region in the image where the signal level is not saturated, based on the difference signal output in the outputting step; and
determining whether an inner region, which includes a desaturated region surrounded by a saturated region, exists in the image, wherein the determining step includes calculating a position of a center of gravity of the inner region, and specifying a determination direction group serving as a set of determination directions, each of the determination directions being a linear direction passing through the center of gravity and crossing the surrounding saturated region toward the desaturated region.

14. The method according to claim 13, wherein the determining step includes determining a width of the saturated region in each determination direction of the determination direction group at a portion where the saturated region around the inner region contacts the inner region and an outer desaturated region, determining whether widths of the saturated region in respective determination directions are equal to each other, and, when it is determined that the widths of the saturated region in the respective determination directions are equal to each other, determining that a bright light image inversion phenomenon has occurred.

15. A signal processing method comprising steps of:
outputting a difference signal between a signal level and a noise level output from each of plurality of pixels;
recognizing a saturated region in an image obtained by photoelectric conversion where the signal level is saturated, and a desaturated region in the image where the signal level is not saturated, based on the difference signal output in the outputting step; and
determining whether an inner region, which includes a desaturated region surrounded by a saturated region, exists in the image, wherein the determining step includes determining whether the signal level of the saturated region around the inner region has dropped from a saturation signal amount when either of an exposure amount and an exposure time is increased.

16. A signal processing method comprising steps of:
outputting a difference signal between a signal level and a noise level output from each of plurality of pixels;
recognizing a saturated region in an image obtained by photoelectric conversion where the signal level is saturated, and a desaturated region in the image where the signal level is not saturated, based on the difference signal output in the outputting step; and
determining whether an inner region, which includes a desaturated region surrounded by a saturated region, exists in the image, wherein the determining step includes determining whether a rate of increase of the signal level at a determination signal level is higher than a first threshold when coming close to the saturated region around the inner region outside from the saturated region.

17. A signal processing method comprising steps of:
outputting a difference signal between a signal level and a noise level output from each of plurality of pixels;
recognizing a saturated region in an image obtained by photoelectric conversion where the signal level is saturated, and a desaturated region in the image where the signal level is not saturated, based on the difference signal output in the outputting step; and
determining whether an inner region, which includes a desaturated region surrounded by a saturated region, exists in the image, wherein the determining step includes determining whether a width of the inner region is larger than a second threshold.

* * * * *